US012638625B1

(12) United States Patent
Retterath

(10) Patent No.: US 12,638,625 B1
(45) Date of Patent: May 26, 2026

(54) RADIATIVE HEATING AND COOLING USING ASYMMETRIC INFRARED REFLECTIVE ARTICLES

(71) Applicant: Vergence Automation, Inc., Chaska, MN (US)

(72) Inventor: James E. Retterath, Chaska, MN (US)

(73) Assignee: Vergence Automation, Inc., Chaska, MN (US)

( * ) Notice: Subject to any disclaimer, the term of this patent is extended or adjusted under 35 U.S.C. 154(b) by 553 days.

(21) Appl. No.: 17/744,377

(22) Filed: May 13, 2022

Related U.S. Application Data

(60) Provisional application No. 63/188,171, filed on May 13, 2021.

(51) Int. Cl.
*G02B 5/20* (2006.01)
*G02B 5/26* (2006.01)

(52) U.S. Cl.
CPC ............... *G02B 5/208* (2013.01); *G02B 5/26* (2013.01)

(58) Field of Classification Search
CPC . G02B 5/208; G02B 5/26; G02B 1/00; G02B 1/02; G02B 5/08; G02B 5/12; G02B 5/122; G02B 5/124; G02B 5/136; G02B 5/20; G02B 5/265
USPC ................ 359/359, 350, 529, 530, 838, 839
See application file for complete search history.

(56) References Cited

U.S. PATENT DOCUMENTS

| | | | | |
|---|---|---|---|---|
| 8,873,175 | B2 * | 10/2014 | Kobayashi | ............. G02B 5/124 359/837 |
| 9,507,064 | B2 | 11/2016 | Brongersma et al. | |

| | | | | |
|---|---|---|---|---|
| 9,709,349 | B2 | 7/2017 | Raman et al. | |
| 9,923,111 | B2 | 3/2018 | Fan et al. | |
| 10,088,251 | B2 | 10/2018 | Raman et al. | |
| 10,126,466 | B2 | 11/2018 | Lin et al. | |
| 10,324,314 | B2 | 6/2019 | Czaplewski et al. | |
| 10,725,290 | B2 | 7/2020 | Fan et al. | |
| 2015/0173302 | A1 * | 6/2015 | Duncan | ................ G02B 27/143 359/359 |

FOREIGN PATENT DOCUMENTS

| | | | | | |
|---|---|---|---|---|---|
| CA | 2845905 | C | * | 11/2018 | ............... E04B 1/74 |
| JP | 2006243618 | A | * | 9/2006 | ............. G02B 5/124 |

OTHER PUBLICATIONS

Deppe et al., "Nighttime Photovoltaic Cells: Electrical Power Generation by Optically Coupling with Deep Space", Abstract, ACS Photonics 2020, 7, 1, 1-9, Nov. 20, 2019 accessed on Jun. 4, 2024 at https://doi.org/10.1021/acsphotonics.9b00679, 11 pages.
Fell, "Anti-Solar Cells: A Photovoltaic Cell That Works at Night", The Regents of the University of California, Davis, Jan. 29, 2020, accessed on Jun. 4, 2024 at https://www.ucdavis.edu/curiosity/news/anti-solar-cells-photovoltaic-cell-works-night, 8 pages.

* cited by examiner

*Primary Examiner* — Arnel C Lavarias
(74) *Attorney, Agent, or Firm* — Barnes & Thornburg LLP

(57) ABSTRACT

In embodiments, a retroreflective article with a flat surface and an infrared (IR) reflective boundary exhibits high transmittance of infrared radiation from the reflective boundary through the flat surface and exhibits low transmittance of infrared radiation from the flat surface through the reflective boundary. In embodiments, the asymmetric infrared reflective article is abbreviated as AIR(λ) article, meaning that the asymmetric transmittance is defined over a wavelength range defined as λ.

27 Claims, 24 Drawing Sheets

(prior art)

Reflectivity vs. Entrance Angle at a Corner Cube Reflective Boundary

Transmittance vs. refracted incident angle for a flat incident surface

Transmittance at Reflective Boundary vs. Index of Refraction for Corner Cube Optics with Ideal Surface Smoothness Transmittance at Reflective Boundary vs. Index of Refraction for 180° Apex Axis Angle Corner Cube Reflective Layer with Various Average Surface Roughness Values Absorption, Transmittance and Reflection of Incident Radiation by a Body

Fig. 12

Energy % for each 1 μm of Spectrum for Radiated Energy

Index of Refraction μ(λ) for Cesium Iodide (CsI)

Transmittance t(λ) for Cesium Iodide (CsI)

Radiative Cooling Steady-state Temp. vs. Corner Cube Surface Roughness for CsI for 20° C. Ambient Temp.

Radiative Cooling Steady-state Temp. vs. Corner Cube Surface Roughness for High-IR-transmittance Materials for 20° C. Ambient Temp.

$t(\lambda)_{\text{low-dir}}$ $t(\lambda)_{\text{high-dir}}$

144

140

148

149

146

142

Radiative Heating Steady-state Temp. vs. Corner Cube Surface Roughness for High-IR-transmittance Materials for 20° C. Ambient Temp.

Fig. 24

RADIATIVE HEATING AND COOLING USING ASYMMETRIC INFRARED REFLECTIVE ARTICLES

RELATED APPLICATION

This application claims the benefit of U.S. Provisional Application No. 63/188,171 filed May 13, 2021, which is hereby fully incorporated herein by reference.

FIELD OF THE INVENTION

The present disclosure relates to passive radiative heating and cooling. More particularly, the present disclosure relates to articles that reflect and transmit infrared radiation through a material in non-symmetric quantities.

BACKGROUND OF THE INVENTION

U.S. Pat. Nos. 9,709,349, 9,923,111, and 10,088,251 (Raman) disclose structures for radiative cooling that reflect most radiation in the solar spectrum—defined by Raman as ultraviolet, visible and near-IR wavelengths. Raman structures include materials that block most solar 20 radiation while having high transmittance for thermally-generated emissions for mid-infrared wavelengths. The use of material properties by Raman to block or reflect solar radiation illustrates a fundamental shortcoming of the approach.

Optical elements exist that perform waveguide shaping, rejection of certain optical wavelengths, or high transmission efficiency within wavelength ranges. U.S. Pat. No. 9,507,064 (Brongersma), U.S. Pat. No. 10,126,466 (Lin), and U.S. Pat. No. 10,725,290 (Fan) disclose patterned gradient metasurface device for optical wavefront shaping. U.S. Pat. No. 10,324,314 (Czaplewski) discloses an optical device with a plurality of Huygens resonators for producing an optical element with high transmission efficiency in the 400-700 nm wavelength range of visible light. In general, such metasurface optical devices are used only for visible light applications.

SUMMARY OF THE INVENTION

In embodiments, a retroreflective article consisting of a flat surface and an infrared (IR) reflective boundary exhibits high transmittance of infrared radiation from the reflective boundary through the flat surface and exhibits low transmittance of infrared radiation from the flat surface through the reflective boundary. In embodiments, the asymmetric infrared reflective article is abbreviated as AIR($\lambda$) article, meaning that the asymmetric transmittance is defined over a wavelength range defined as $\lambda$.

In embodiments, an AIR($\lambda$) article is produced from a material that has a medium or high index of refraction for the desired wavelength region. In embodiments, desired wavelength regions are selected based on the percentage of Planck gasses that are contained within wavelength bands around room temperature (~20° C.). In embodiments, desired wavelength regions for medium or high indices of refraction for near-room-temperature passive radiative heating and cooling applications are 7-14 $\mu$m, 6-19 $\mu$m, 4.5-29 $\mu$m or 4-40 $\mu$m.

In embodiments, an AIR($\lambda$) article is produced from a material that has a high material transmittance for the desired wavelength regions. In embodiments, material transmittance properties are greater than 0.8 and greater than 0.85 for near-room-temperature passive radiative heating and cooling applications for desired wavelength regions.

In embodiments, corner cube surfaces are produced with small average surface roughness values in order to increase the amount of Total Internal Reflection (TIR) that occurs at the reflective boundary on the material side of the corner cube elements. In embodiments, surface roughness values are selected from less than 0.01 $\mu$m, less than 0.005 $\mu$m, less than 0.002 $\mu$m, less than 0.001 $\mu$m, and less than 0.0005 $\mu$m.

In embodiments, an AIR($\lambda$) article is produced from a material that is selected from a list that includes, but is not limited to, Cesium Iodide (CsI), Cadmium Telluride (CdTe), Cesium Bromide (CsBr), Gallium Arsenide (GaAs), Germanium (Ge), Potassium Bromide (KBr), Potassium Chloride (KCl), Zinc Selenide (ZnSe), and Chalcogenide Glass.

In embodiments, five-layer constructions for radiative cooling in the presence of solar radiation include, but are not limited to, dwellings in tropical climates and buildings that experience unwanted passive heating due to direct sunlight. In embodiments, radiative cooled dwellings and buildings are produced with outer walls and/or or rooftops that include AIR($\lambda$) article five-layer constructions in a warm-side-out orientation.

In embodiments, five-layer constructions for radiative cooling in the absence of solar radiation include, but are not limited to, dwellings and buildings that are produced with inner walls and appliances and consumer or industrial devices that are produced with inner or outer walls that wish to reduce or eliminate active cooling systems for internal components or spaces. In embodiments, radiative cooled dwellings or buildings are produced with inner walls or shells and appliances or devices are produced with outer shells, walls or containers that include AIR($\lambda$) article five-layer constructions in a warm-side-out orientation.

In embodiments, five-layer constructions for radiative heating in the presence of solar radiation include, but are not limited to, replacements for glass panels in greenhouse applications and for use in the production of passively-heated water heaters. In embodiments, greenhouse panels or passively-heated appliances are produced with outer shells, walls or containers that include AIR($\lambda$) article five-layer constructions in a warm-side-in orientation.

In embodiments, five-layer constructions for radiative heating in the absence of solar radiation include, but are not limited to, coating material for internal pipes, tubes or conduits that transport heated gasses or fluids. In embodiments, pipes, tubes or conduits are produced with an inner construction made of non-insulated air-carrying or fluid-carrying material and an outer AIR($\lambda$) article five-layer construction in a warm-side-in orientation.

In embodiments, an AIR($\lambda$) article is used as a thermal cloaking layer in applications where it is desirable for an object to project a reduced, diminished or non-existent thermal signature. In embodiments, thermally-cloaked objects become non-detectable to thermal radiation sensors.

In embodiments, a five-layer construction for thermal and visible-spectrum cloaking is used as a cloaking layer in applications where it is desirable for an object to project a reduced, diminished or non-existent visible and thermal signature. In embodiments, thermally-cloaked and visible-spectrum cloaked objects become non-detectable to thermal radiation sensors, visible-spectrum sensors, and humans.

It is desirable to have a material the exhibits non-symmetric transmittance of a broad range of infrared wavelengths, thus enabling passive radiative heating and cooling for enclosed spaces or compartments. In various embodiments, such non-symmetric reflective element construction that can block solar radiation along with the rejection of wavelengths well into the infrared spectrum will have a greater impact on radiative cooling than Raman.

BRIEF DESCRIPTION OF THE DRAWINGS

FIG. 2 illustrates a side view of prior art construction for corner cube optics.

FIG. 12 illustrates thermal equilibrium properties between an enclosed gas and an ambient gas through a barrier exhibiting asymmetric IR transmittance.

FIG. 24 illustrates a five-layer construction for radiative heating and radiative cooling applications.

DETAILED DESCRIPTION OF THE EMBODIMENTS

Figure 1:
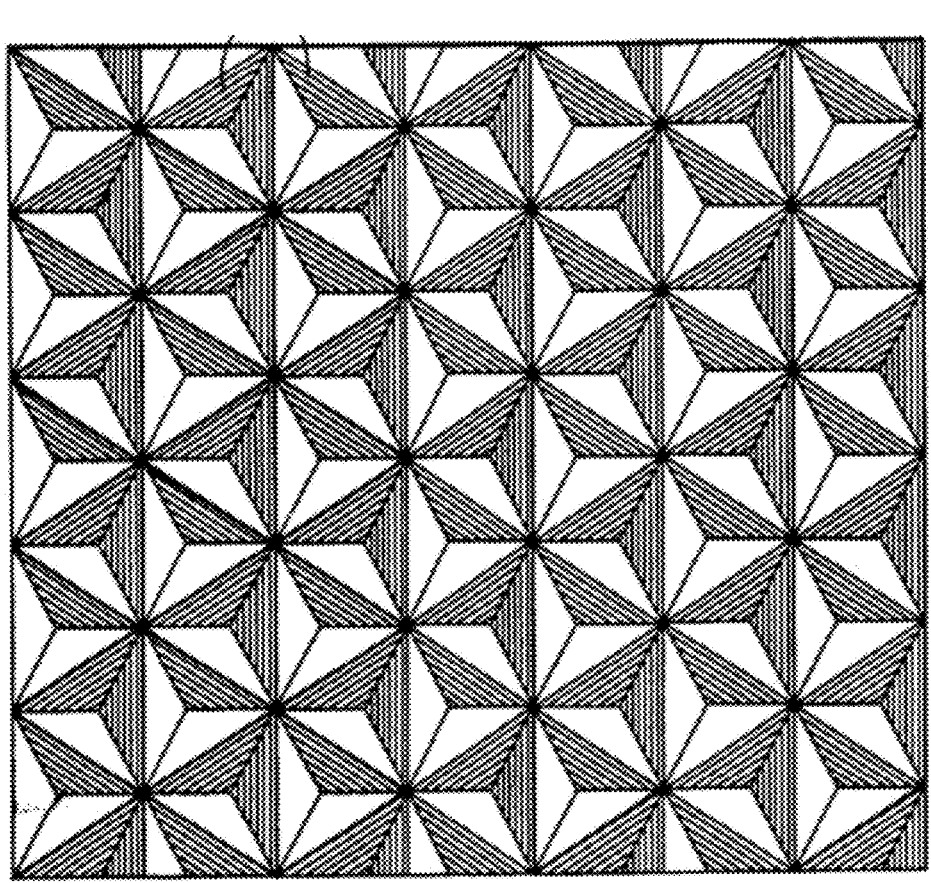
FIG. 1 illustrates prior art construction of corner cube optics used for total internal reflection for visible spectrum radiation.

For purposes of describing the various embodiments, the following terminology and references may be used with respect to reflective articles or materials in accordance with one or more embodiments as described.

"Surface" or "face" means a generally planar boundary of an article or material with another material or environment, where the two materials forming the boundary have both a different composition and a different index of refraction. A surface or face that is generally planar may have varying surface roughness up to some maximum roughness above which the peak/valley characteristics of the surface must be analyzed for retroreflective purposes as a set of individual sub-surfaces. In some embodiments, a surface or face refers to a generally planar aspect of a feature of a retroreflective element of an article or material, such as a corner cube element, chip element or trihedral element. The surface or face feature may be either an internal or external portion of the retroreflective element and the external portion may directly interface with air or vacuum at least partially surrounding the article or material. In other embodiments, a surface may interface with another object, such as a lens or coating or even a layer of water or moisture. A surface may be comprised of one or more facets, and may be either rigid or flexible in form, smooth or rough in texture, and homogenous or heterogeneous in composition.

"Top surface," "front surface," or "incident surface" mean a surface of an article or material exposed to electromagnetic waves, beams, or rays that strike the article or material and may be reflected or refracted by the article or material.

"Back surface" means a surface of an article or material generally opposite from a front surface.

"Layer" means a region of an article, material, element, or chip having thickness relative to a front surface of the article, material, element, or chip. In some embodiments, a layer may be a region of a medium of generally uniform thickness presenting an area that is substantially parallel in orientation to an orientation of the front surface of the article, material, element, or chip, and in some embodiments a layer may have varying thickness and present an area that is not of generally uniform thickness or substantially parallel in orientation to an orientation of the front surface of the article, material, element, or chip. In some embodiments, a layer may be coextensive with an area of the front surface of the article, material, element, or chip, and in other embodiments, a layer may not be coextensive with an area of the front surface. In some embodiments, a layer may be generally rigid and planar, and in other embodiments, a layer may be generally flexible. In some embodiments, a layer may be a medium that is homogenous in composition or construction, and in other embodiments, a layer may be of a medium that is non-homogenous and non-uniform in composition or construction. For example, in most situations involving a relatively thin layer of water on the external surface or face of a retroreflective element having a tilted surface normal angle, the water can be treated as a film for optical purposes and the external surface angle of that film will generally correspond to the tilted surface normal angle. However, in situations where there is enough water on the external surface or face of a retroreflective element to create standing droplets or otherwise pool into depressions in a region of the overall surface structure of the article or material, then the water surface may not correspond to the tilted surface normal angle for those regions.

"Normal" describes a direction that intersects a surface or boundary at right angles.

"Entrance angle" is defined as the angle of a ray, beam, or wave of incident electromagnetic radiation relative to a normal angle for a sign, pavement marking or other reflective product.

"Boundary" is a change of medium defined by a face, facet, surface, and/or material having a different index of refraction.

"Incidence angle" or "angle of incidence" is defined as the angle relative to normal of a ray, beam, or wave of electromagnetic radiation as it strikes a boundary within an article or material.

"Critical angle" is measured from a normal angle to a surface and is defined as the minimum incident angle at which TIR occurs at a surface. A critical angle is defined in the medium exhibiting the higher index of refraction.

"Corner cube element" describes a TIR retroreflective element, such as a trihedral pyramid, having multiple faces of the pyramid oriented at 90 degrees with respect to each other.

"Apex" means the tip of a corner cube pyramid as defined by the intersection of the edges of the faces of the pyramid other than the edges of the base of the pyramid.

"Apex axis" means a line intersecting the apex of a corner cube pyramid that is equidistant from each face of the pyramid.

"Rigid" means substantially rigid under normal conditions such that the planar nature of the retroreflective element or near-ideal TIR retroreflective element is maintained.

"Fresnel Equations" refer to mathematical constructs that define the reflection and transmission coefficients for parallel and polarized light at various entrance angles. Fresnel Equations illustrate that as an entrance angle approaches 90 degrees, the transmission coefficient for parallel and polarized light decreases exponentially.

"Optical Isolator" refers to an optical component that allows the transmission of light in only one direction.

"Solar irradiance" is the power per unit area received from the sun in the form of electromagnetic radiation as reported in the wavelength range of a measuring instrument. Solar irradiance is measured in watts per square meter (W/m$^2$) in SI units.

Figure 2:
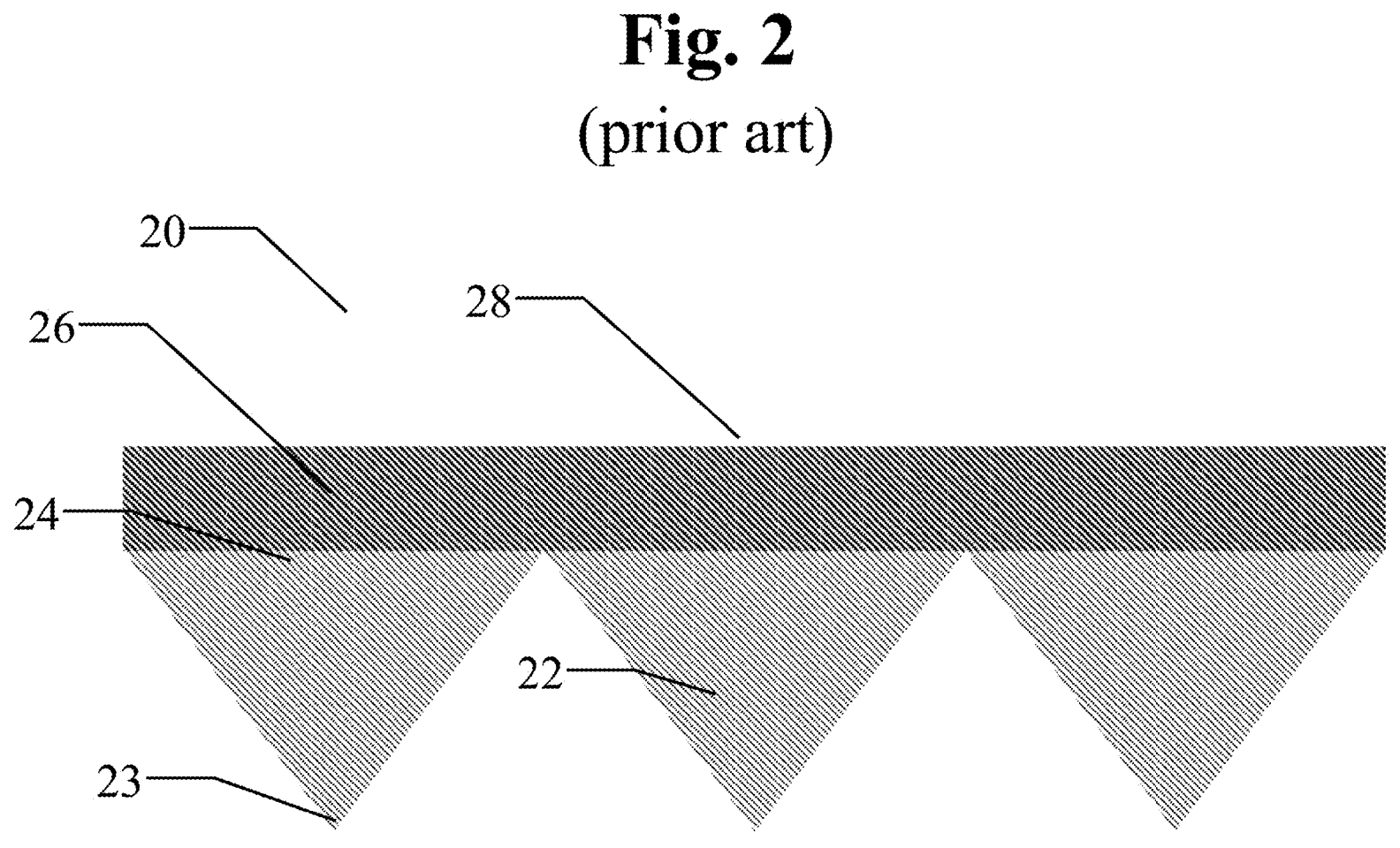

FIGS. 1 and 2 illustrate a portion of a typical replicated corner cube retroreflective sheet 20 known in the prior art that enhances retroreflection to improve the visibility of the sheeting when used for road signs, road markers and the like. Referring to both FIGS. 1 and 2, reference 22 generally designates one of the minute corner cube elements of formed prism features disposed in an array on one side of sheeting 20. Each retroreflective element 22 has the shape of a trihedral prism with three exposed planar faces, substantially perpendicular to one another, and an apex axis defined by a line intersecting the apex of the trihedral prism that is equidistant to each of the planar faces. The angle between the faces of the trihedral prism is the same for each corner cube element in the array and will be about 90 degrees.

As is illustrated in FIG. 2, corner cube elements 22 in sheet 20 can be all of the same dimensions and aligned in an array or pattern of rows and columns, the bases being in the same plane, and adjacent elements being contiguous at the edges of their bases such that there are no margins or flats between adjacent elements or spaced apart as desired. Body portion 26 is typically integral with corner cube optical elements 22, constituting what is referred to as a land that defines a front surface 28 into which electromagnetic radiation in the form of visible light enters. The dimensions of the land portion of the sheeting relative to the individual corner cube optical elements will vary depending on the material of the medium of the sheeting, the method chosen for manufacture and, ultimately, the end purpose of the sheeting.

It is helpful to note that the trihedral prism elements 22 in cross-sectional FIG. 2 are shown as effectively being upsidedown from a conventional pyramid in that the apex 23 is below the base 24 which is operably connected to the body portion 26. The triangular structure of the trihedral prism element 22 that provides the TIR phenomenon is the inverted shaded shape shown in this cross-section as the figure portion of a figure-ground representation, and not the corresponding unshaded upright triangular shape that is effectively the ground portion in this representation. It should be noted that for open-faced cube-corner constructions in some of the prior art, the trihedral prism elements are inverted as compared to conventional cube-corner feature orientation as these open-faced cube-corner constructions are oriented in a tip-side up configuration.

Corner cube elements of the prior art that are not of an open-faced construction produce retroreflection due to total internal reflection (TIR). Faces of corner cube elements will produce TIR when rays or beams of visible light strike the internal boundaries of the medium forming the retroreflective elements at an angle of incidence greater than the critical angle. The critical angle is measured from the normal angle to each boundary. For retroreflective articles and materials, it is common to refer to the angle of the incoming rays, beams or electromagnetic waves that strike the front surface of the material or article as being the entrance angle, whereas the angles of the ray, beam or wave as it propagates internally within the medium and encounters one or more additional boundaries, such as the face of a corner cube, are referred to as the incidence angles or angles of incidence. One example of an ultra-wide angle reflector is described in U.S. Pat. No. 11,001,979 (Retterath), the disclosure of which is hereby incorporated by reference.

TIR retroreflectivity for an article with a flat front surface and a corner cube back surface is defined by the index of refraction of the medium that contains the article (typically air), the index of refraction of the material used to produce the article, and the index of refraction of the material behind the corner cube elements. The critical angle at the corner cube surface is referenced from the corner cube normal angle and is defined by Snell's law:

$$\eta_1 * \sin\theta_1 = \eta_2 * \sin\theta_2 \qquad \text{Eq. 1}$$

where $\eta_1$ is the index of refraction of medium 1
  $\theta_1$ is the angle of the wave in medium 1
  $\eta_2$ is the index of refraction of medium 2
  $\theta_2$ is the angle of the wave in medium 2

Figure 3:
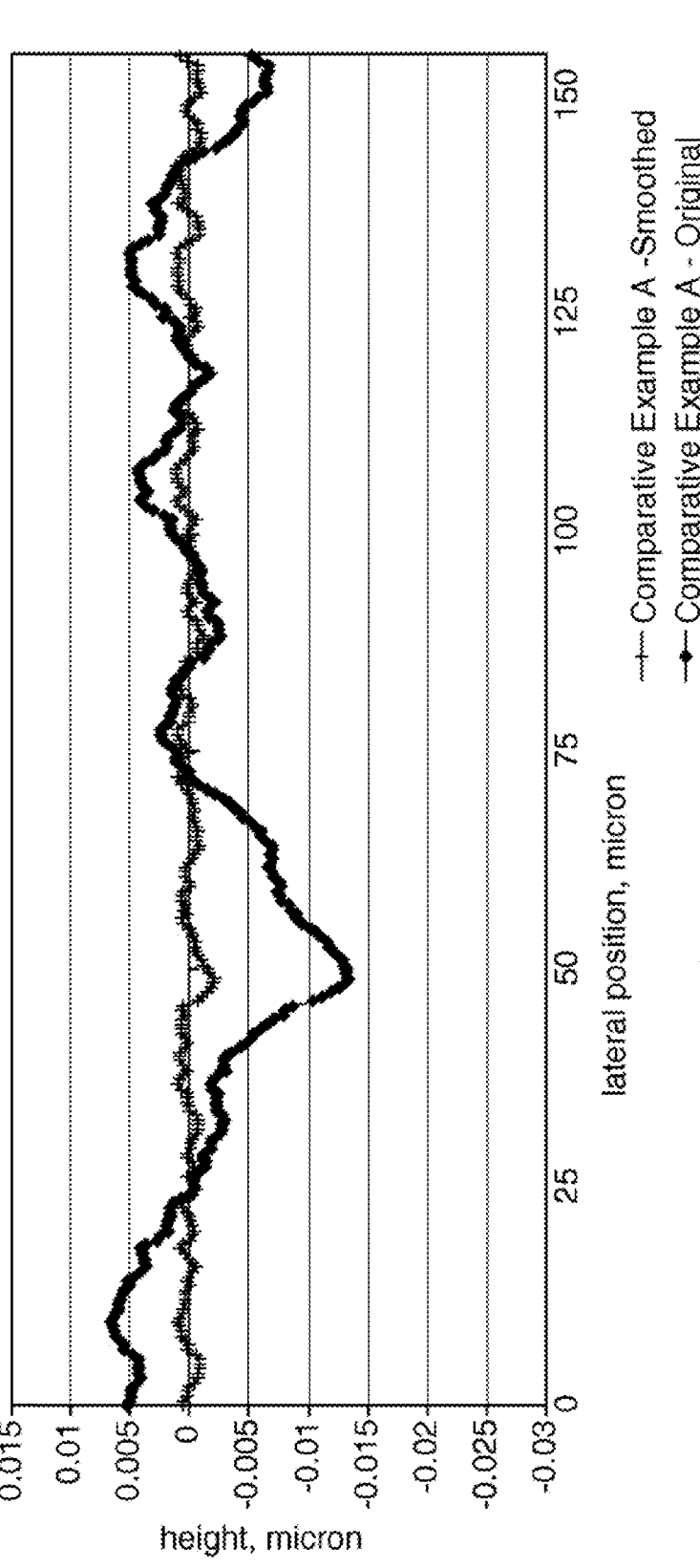
FIG. 3 illustrates prior art surface roughness measures for corner cube optics.

Element reflectivity for a corner cube construct is the total of all reflectivity values at each and every surface of the corner cube element and is defined by Eq. 2 below:

$$\int_{\rho=-90}^{\rho=+90} \int_{\varphi=-90}^{\varphi=+90} \prod_{a=1}^{a=3} p.sub.a(\rho, \varphi) * R.sub.a(\rho, \varphi)$$

Where $\rho$=horizontal angle of incidence in the reflective medium
  $\varphi$=vertical angle of incidence in the reflective medium
  a=variable representing the three surfaces of a corner cube construct
  $p_a$ is the probability that a refracted incident wave first strikes a surface
  $R_a$ is the reflectivity of the wave at the face boundary, with
    $R_a$=1 for TIR, and
    $R_a$=percent reflectance for non-TIR FIG. 3 illustrates prior art corner cube roughness measurements as disclosed in U.S. Pat. No. 8,783,879 (Smith). Smith discloses a method of utilizing a moving average to smooth the data points and to remove the effects of surface form and curvature. FIG. 3 shows an original set and the resulting smoothed set of data points for a corner cube face. Smith further discloses the use of an equation for average roughness of a surface as:

$$R_{avg}=(1/L)\Sigma(Z(x)*\Delta x) \qquad \text{Eq. 3}$$

Where $R_{avg}$ is the average roughness
  L is the length of the face for which measurements were made
  Z(x) is the vertical position of the smoothed data as a function of lateral position
  $\Delta x$ is distance of each point from zero Utilizing Eq. 3 from Smith and the data from FIG. 3, the sample produces an average roughness value of 0.00051 microns. Average face roughness will exhibit multiple impacts on reflected lightwaves based on the wavelengths of the surface roughness. High-frequency roughness will result in losses of TIR and of specular reflectance. Medium-frequency roughness, as disclosed in Smith, will impact the range of angles at which TIR occurs for each face for visible light. With respect to Eq. 2, average, medium-frequency roughness will impact the $R_{avg}$ terms.

Figure 4:
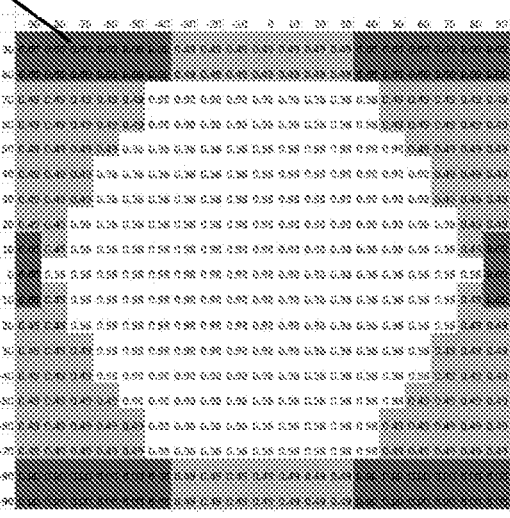
FIG. 4 illustrates a reflectivity map for corner cube optics.

Intensity plots in FIG. 4 illustrate the performance characteristics for a retroreflective element with a corner cube construction of a TIR retroreflective element with three different average surface roughness values. The numbers in the reflectivity plot 40 denote the retroreflectivity of a TIR retroreflective element for visible light and will range from index of refraction refers to the refractive index of the material that abuts, interfaces to, or is adhered to the corner cube elements of the retroreflective element. Apex axis angle refers to the angle at which the faces of each three-face corner cube construction are equiangular. An apex axis angle of 180 degrees refers to prior art corner cube constructions whereby the apex axis angle is equal to and in the opposite direction of the normal angle at the upper surface of the retroreflective element. Face roughness refers to the average deviation of the ideal flat surface face from the actual surface face. Corner cube faces that exhibit TIR will reflect 100% of the incident light. For incident light photons at a corner cube face that encounter the surface at an angle that is less than the critical angle, some or all of the signal will cross the boundary and will be subjected to specular reflection at the surface boundary. The amount of specular reflectance will be less than 100% and will be determined by the specular reflectance properties of the backing material. An index of refraction of 1.0 is used for backing materials for three embodiments illustrated in FIG. 4. A surface roughness of 0.0005 microns results in a retroreflective element reflectivity of 0.67, a surface roughness of 0.002 microns results in a retroreflective element reflectivity of 0.63, and a surface roughness 88 of 0.005 microns results in a retroreflective element reflectivity of 0.55.

The reflectivity of a corner cube reflective boundary exhibits TIR at larger angles as the index of refraction of the medium increases. Table 1 below indicates the percent of reflectivity (where 100.0 signifies total reflection) versus entrance angle at the reflective layer of a corner cube element for materials with indices of refraction from $\eta=1.4$ through $\eta=2.5$.

TABLE 1

| | Corner Cube Reflectivity for Reflective Boundary Entrance Angles and Indices of Refraction | | | | | | | | | | | |
| Entr. Angle | $\eta = 1.4$ | $\eta = 1.5$ | $\eta = 1.6$ | $\eta = 1.7$ | $\eta = 1.8$ | $\eta = 1.9$ | $\eta = 2.0$ | $\eta = 2.1$ | $\eta = 2.2$ | $\eta = 2.3$ | $\eta = 2.4$ | $\eta = 2.5$ |
|---|---|---|---|---|---|---|---|---|---|---|---|---|
| 0 | 100.0 | 100.0 | 100.0 | 100.0 | 100.0 | 100.0 | 100.0 | 100.0 | 100.0 | 100.0 | 100.0 | 100.0 |
| 5 | 97.7 | 100.0 | 100.0 | 100.0 | 100.0 | 100.0 | 100.0 | 100.0 | 100.0 | 100.0 | 100.0 | 100.0 |
| 10 | 91.5 | 97.9 | 100.0 | 100.0 | 100.0 | 100.0 | 100.0 | 100.0 | 100.0 | 100.0 | 100.0 | 100.0 |
| 15 | 81.7 | 91.8 | 98.1 | 100.0 | 100.0 | 100.0 | 100.0 | 100.0 | 100.0 | 100.0 | 100.0 | 100.0 |
| 20 | 69.8 | 82.2 | 92.2 | 98.2 | 100.0 | 100.0 | 100.0 | 100.0 | 100.0 | 100.0 | 100.0 | 100.0 |
| 25 | 55.5 | 70.3 | 82.8 | 92.5 | 98.4 | 100.0 | 100.0 | 100.0 | 100.0 | 100.0 | 100.0 | 100.0 |
| 30 | 41.4 | 56.2 | 70.7 | 83.3 | 92.8 | 98.5 | 100.0 | 100.0 | 100.0 | 100.0 | 100.0 | 100.0 |
| 35 | 27.6 | 42.0 | 56.9 | 71.3 | 83.7 | 93.1 | 98.8 | 100.0 | 100.0 | 100.0 | 100.0 | 100.0 |
| 40 | 15.8 | 28.2 | 42.6 | 57.6 | 71.8 | 84.2 | 93.7 | 99.1 | 100.0 | 100.0 | 100.0 | 100.0 |
| 45 | 7.0 | 16.3 | 28.8 | 43.2 | 58.1 | 72.4 | 85.0 | 94.5 | 99.6 | 100.0 | 100.0 | 100.0 |
| 50 | 1.4 | 7.3 | 16.8 | 29.4 | 43.8 | 58.8 | 73.4 | 86.2 | 95.7 | 100.0 | 100.0 | 100.0 |
| 55 | 0.0 | 1.6 | 7.6 | 17.3 | 29.9 | 44.5 | 59.9 | 74.9 | 88.0 | 97.3 | 100.0 | 100.0 |
| 60 | 0.0 | 0.0 | 1.8 | 7.9 | 17.8 | 30.6 | 45.5 | 61.5 | 77.2 | 90.7 | 99.1 | 100.0 |
| 65 | 0.0 | 0.0 | 0.0 | 2.0 | 8.2 | 18.3 | 31.6 | 47.3 | 64.2 | 80.8 | 94.4 | 100.0 |
| 70 | 0.0 | 0.0 | 0.0 | 0.0 | 2.1 | 8.6 | 19.1 | 33.2 | 50.0 | 68.3 | 86.0 | 98.6 |
| 75 | 0.0 | 0.0 | 0.0 | 0.0 | 0.0 | 2.4 | 9.2 | 20.5 | 35.8 | 54.4 | 74.7 | 93.3 |
| 80 | 0.0 | 0.0 | 0.0 | 0.0 | 0.0 | 0.0 | 2.7 | 10.3 | 22.8 | 40.0 | 61.3 | 84.5 |
| 85 | 0.0 | 0.0 | 0.0 | 0.0 | 0.0 | 0.0 | 0.0 | 3.3 | 12.0 | 26.5 | 47.0 | 72.8 |
| 90 | 0.0 | 0.0 | 0.0 | 0.0 | 0.0 | 0.0 | 0.0 | 0.0 | 3.2 | 13.0 | 34.0 | 56.7 |

0.00 for no retroreflectivity to 1.00 for total retroreflectivity with no losses. The cells in the reflectivity plot 40 refer to intensities at various possible entrance angles in the reflective material medium. A parameter table 42 denotes the construction of the TIR retroreflective element. Based on the parameters in the table 42, the reflectivity is determined for the chosen geometry and material.

Figure 5:
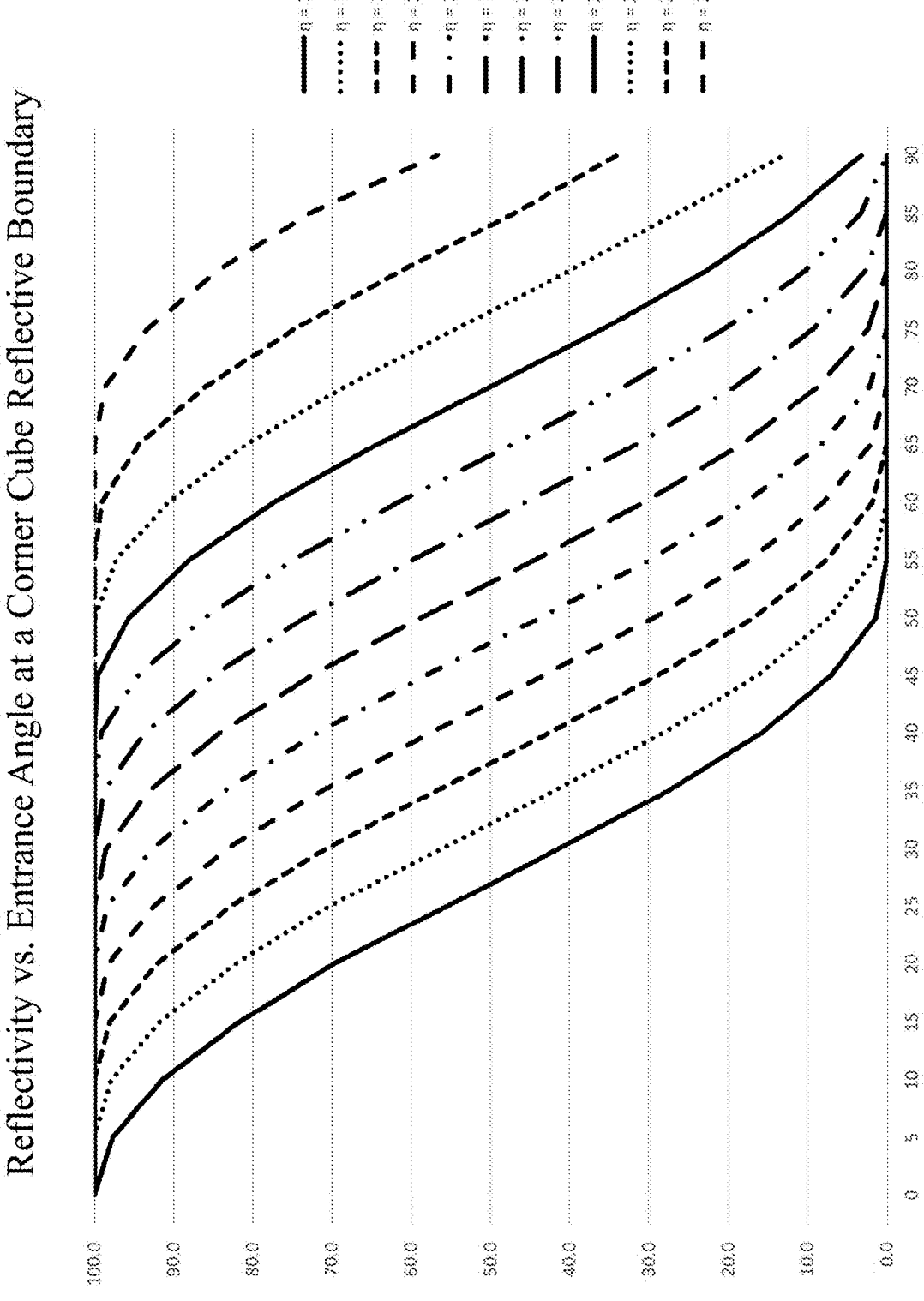
FIG. 5 illustrates reflectivity versus entrance angle for a corner cube reflective boundary.

A reflectivity plot 40 is based on five selectable parameters. Article index of refraction refers to the refractive index of the material from which the element is produced. Backing FIG. 5 illustrates the information from Table 1 graphically.

A reflective boundary used within or as part of a reflective article is an optical construct that determines how photons propagate through or are reflected by the boundary. Reflective boundaries have been used extensively in reflective articles for increasing the retroreflective properties of visible light for products like sign sheeting for reflective road signs. These sign sheeting materials have been optimized to produce high reflectivity results for incident photon radiation in and around the visible spectrum, roughly 400 to 700 nanometers, or 0.4 μm to 0.7 μm.

Photon-based electromagnetic energy also exists in wavelength ranges of ultraviolet (UV)—100-400 nm, visible—400-700 nm, near infrared (NIR)—700-1400 nm, infrared (IR)—1400-8000 nm, long-wavelength IR (LWIR)—8 μm-15 μm, far IR (FIR)—15 μm-1000 μm, or terahertz—0.1 mm-1 mm. Although it does not have a typical designation, the thermal range of the electromagnetic spectrum is the wavelength range at which heat is emitted and/or absorbed. The wavelength range for thermal energy is temperature dependent, and is roughly between about 4.5 μm to 29 μm, which is the wavelength range at which over 80% of thermal energy is transferred between gaseous, liquid or solid matter at or around room temperature.

The Fresnel equation for the transmission coefficient for a flat top surface for non-polarized electromagnetic radiation, $t_s$, is:

$$t_s = (2\eta_1 \cos \theta_i)/(\eta_1 \cos \theta_i) + \eta_2 \cos \theta_t) \qquad \text{Eq. 4}$$

Where $\eta_1$ is the index of refraction of the incident material $\eta_2$ is the index of refraction of the transmission material $\theta_i$ is the angle of the incident radiation $\theta_t$ is the angle of the transmitted radiation For a material consisting of a flat top surface and a corner cube reflective boundary, the transmittance of the reflective article as a function of the refracted angle for indices of refraction from $\eta = 1.4$ through $\eta = 2.5$ is shown in Table 2 below:

| | $\eta = 1.4$ | $\eta = 1.5$ | $\eta = 1.6$ | $\eta = 1.7$ | $\eta = 1.8$ | $\eta = 1.9$ | $\eta = 2.0$ | $\eta = 2.1$ | $\eta = 2.2$ | $\eta = 2.3$ | $\eta = 2.4$ | $\eta = 2.5$ |
|---|---|---|---|---|---|---|---|---|---|---|---|---|
| 0 | 0.83 | 0.80 | 0.77 | 0.74 | 0.71 | 0.69 | 0.67 | 0.65 | 0.63 | 0.61 | 0.59 | 0.57 |
| 5 | 0.83 | 0.80 | 0.77 | 0.74 | 0.71 | 0.69 | 0.66 | 0.64 | 0.62 | 0.60 | 0.58 | 0.56 |
| 10 | 0.83 | 0.79 | 0.76 | 0.73 | 0.70 | 0.67 | 0.65 | 0.62 | 0.60 | 0.58 | 0.56 | 0.54 |
| 15 | 0.82 | 0.78 | 0.74 | 0.71 | 0.67 | 0.64 | 0.61 | 0.59 | 0.56 | 0.53 | 0.51 | 0.48 |
| 20 | 0.80 | 0.76 | 0.72 | 0.67 | 0.64 | 0.60 | 0.56 | 0.52 | 0.48 | 0.44 | 0.40 | 0.36 |
| 25 | 0.78 | 0.73 | 0.67 | 0.62 | 0.57 | 0.51 | 0.46 | 0.39 | 0.31 | 0.20 | 0.00 | 0.00 |
| 30 | 0.74 | 0.67 | 0.60 | 0.53 | 0.44 | 0.32 | 0.00 | 0.00 | 0.00 | 0.00 | 0.00 | 0.00 |
| 35 | 0.68 | 0.59 | 0.47 | 0.27 | 0.00 | 0.00 | 0.00 | 0.00 | 0.00 | 0.00 | 0.00 | 0.00 |
| 40 | 0.58 | 0.38 | 0.00 | 0.00 | 0.00 | 0.00 | 0.00 | 0.00 | 0.00 | 0.00 | 0.00 | 0.00 |
| 45 | 0.25 | 0.00 | 0.00 | 0.00 | 0.00 | 0.00 | 0.00 | 0.00 | 0.00 | 0.00 | 0.00 | 0.00 |
| 50 | 0.00 | 0.00 | 0.00 | 0.00 | 0.00 | 0.00 | 0.00 | 0.00 | 0.00 | 0.00 | 0.00 | 0.00 |
| 55 | 0.00 | 0.00 | 0.00 | 0.00 | 0.00 | 0.00 | 0.00 | 0.00 | 0.00 | 0.00 | 0.00 | 0.00 |
| 60 | 0.00 | 0.00 | 0.00 | 0.00 | 0.00 | 0.00 | 0.00 | 0.00 | 0.00 | 0.00 | 0.00 | 0.00 |
| 65 | 0.00 | 0.00 | 0.00 | 0.00 | 0.00 | 0.00 | 0.00 | 0.00 | 0.00 | 0.00 | 0.00 | 0.00 |
| 70 | 0.00 | 0.00 | 0.00 | 0.00 | 0.00 | 0.00 | 0.00 | 0.00 | 0.00 | 0.00 | 0.00 | 0.00 |
| 75 | 0.00 | 0.00 | 0.00 | 0.00 | 0.00 | 0.00 | 0.00 | 0.00 | 0.00 | 0.00 | 0.00 | 0.00 |
| 80 | 0.00 | 0.00 | 0.00 | 0.00 | 0.00 | 0.00 | 0.00 | 0.00 | 0.00 | 0.00 | 0.00 | 0.00 |
| 85 | 0.00 | 0.00 | 0.00 | 0.00 | 0.00 | 0.00 | 0.00 | 0.00 | 0.00 | 0.00 | 0.00 | 0.00 |
| 90 | 0.00 | 0.00 | 0.00 | 0.00 | 0.00 | 0.00 | 0.00 | 0.00 | 0.00 | 0.00 | 0.00 | 0.00 |

The present invention recognizes that, because photons in the thermal wavelength range exhibit photonic properties like photons in the visible spectrum, it is possible to utilize retroreflective techniques, like TIR, that have proven successful in the visible spectrum in the thermal range to better manage and control transfer of thermal energy. In embodiments, TIR or other highly reflective asymmetric boundary constructs are used to provide reflective boundary properties to wavelengths in and around the thermal range of the electromagnetic spectrum. By utilizing an asymmetric reflective boundary in the thermal range, a reflective boundary acts like a thermal insulator for thermal energy that approaches the reflective boundary from the high-index-of-refraction side of the boundary and acts like a thermal transmitter for thermal energy that approaches the reflective boundary from the low-index-of-refraction side of the boundary.

The operation of embodiments of the present disclosure can be understood based on how electromagnetic radiation that encounters a surface will exhibit transmission and reflection characteristics based on the index of refraction of the incident medium, the index of refraction of the material through which it transmits, and the incident angle of the radiation. Fresnel equations determine the electric and magnetic field amplitudes for transmitted and reflected radiation.

Figure 6:
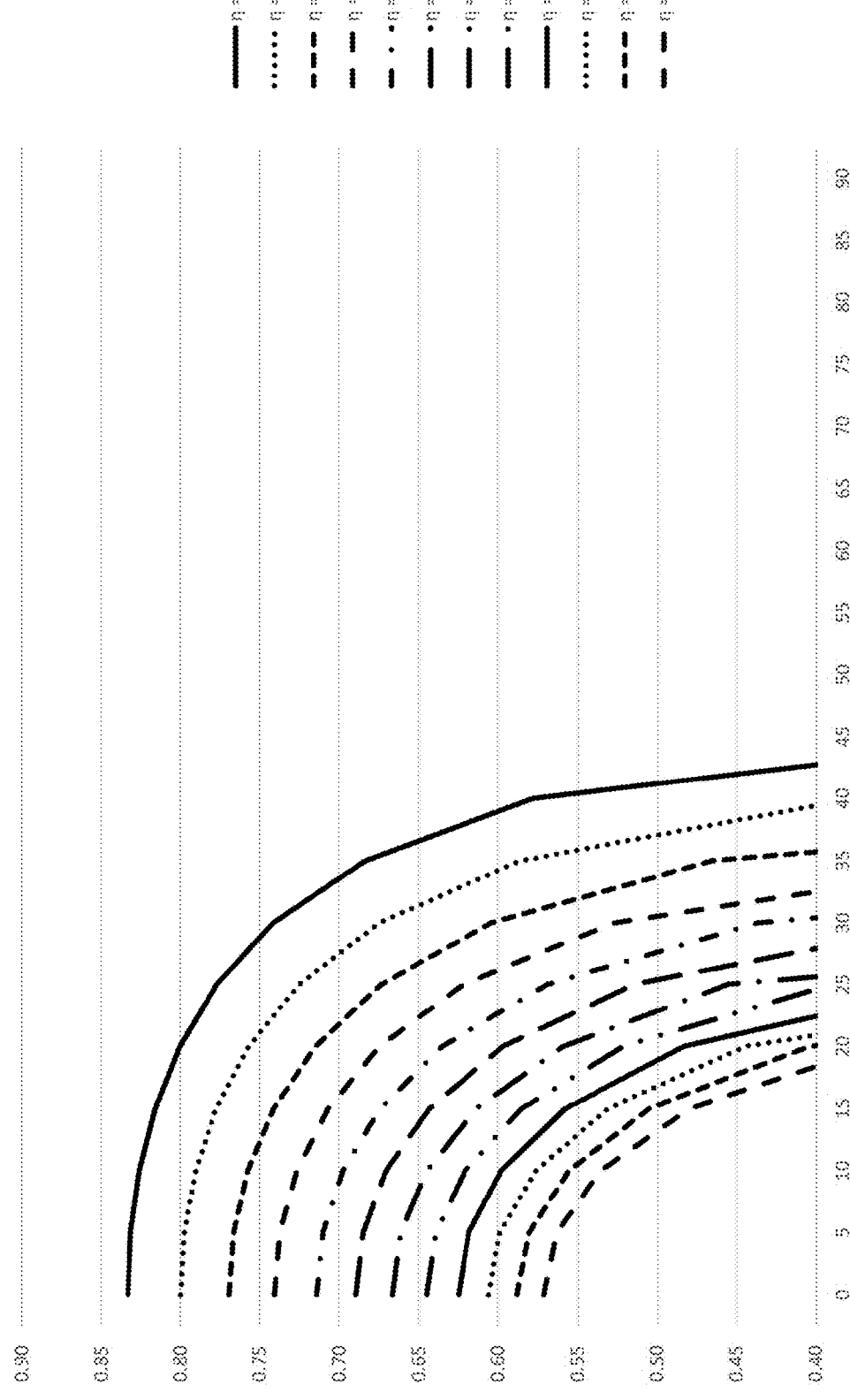
FIG. 6 illustrates transmittance verses refracted incident angle for a flat incident surface.

FIG. 6 illustrates graphically the relationship between a refracted angle and an index of refraction for transmittance through a reflective corner cube barrier.

In order to maximize the reflective properties of a corner cube reflective boundary, the transmittance of the reflective boundary should be near zero, representing no transmittance through the reflective boundary from the high-index-of-refraction side of the boundary. To determine a corner cube transmittance function at a reflective boundary as a function of an index of refraction of a material, a convolution is performed of the reflective boundary reflectivity function and the Fresnel transmission function for a material. For 180° apex axis angle corner cube optics, the relationship of reflective boundary transmittance to material index of refraction for near-ideal corner cube surface smoothness is represented in Table 3 below:

| IoR | 1 | 1.1 | 1.2 | 1.3 | 1.4 | 1.5 | 1.6 | 1.7 | 1.8 | 1.9 | 2 | 2.1 | 2.2 | 2.3 | 2.4 |
|---|---|---|---|---|---|---|---|---|---|---|---|---|---|---|---|
| Trans. | 1 | 0.7 | 0.48 | 0.27 | 0.154 | 0.062 | 0.030 | 0.012 | 0.002 | 0.000 | 0.000 | 0.000 | 0.000 | 0.000 | 0.000 |

Figure 7:
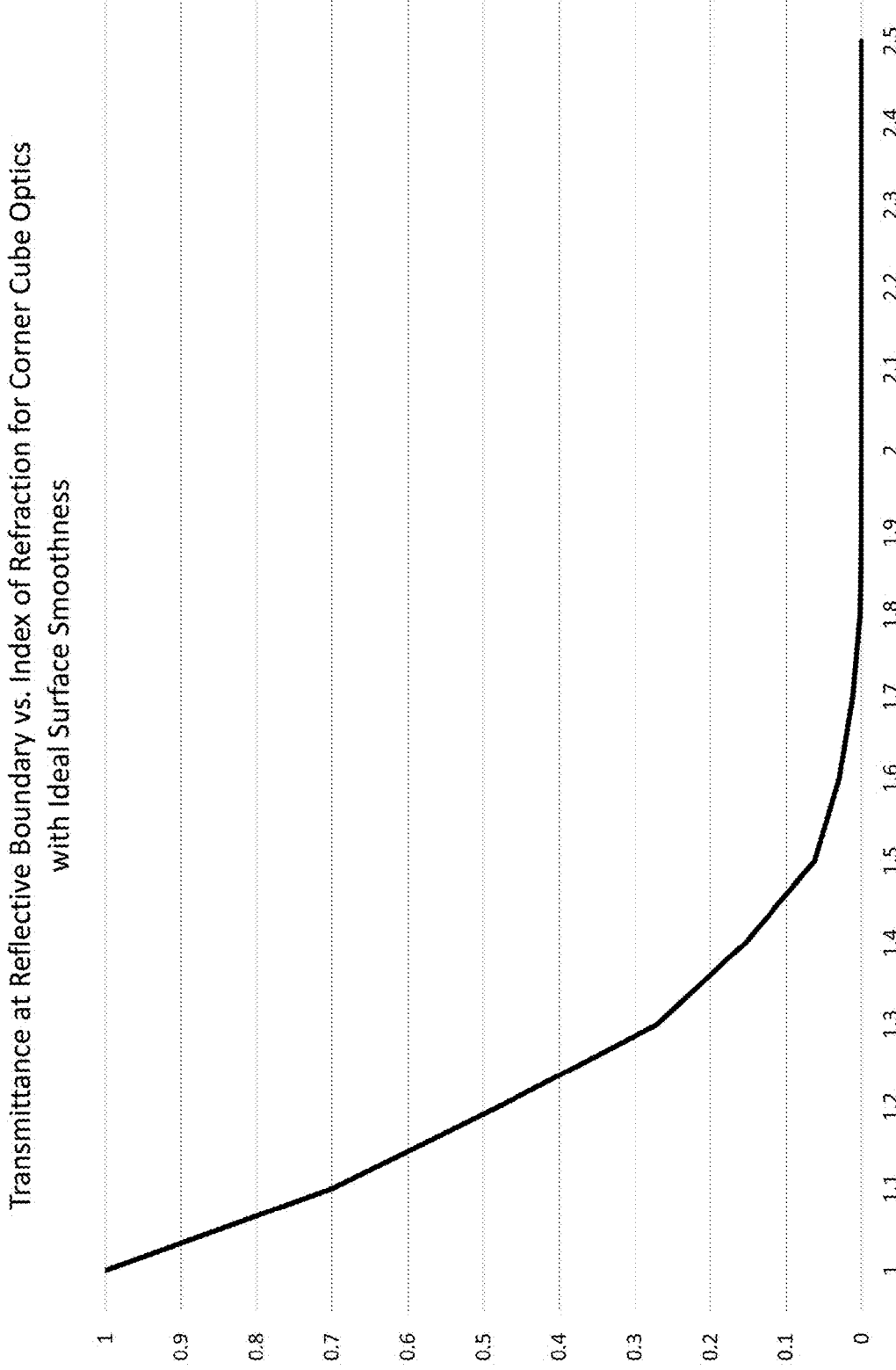
FIG. 7 illustrates transmittance at a reflective boundary versus a material index of refraction for corner cube optics.

FIG. 7 illustrates the result of the convolution and represents the reflective boundary transmittance of a corner cube material with air ($\eta = 1.0$) as a backing.

Figure 8:
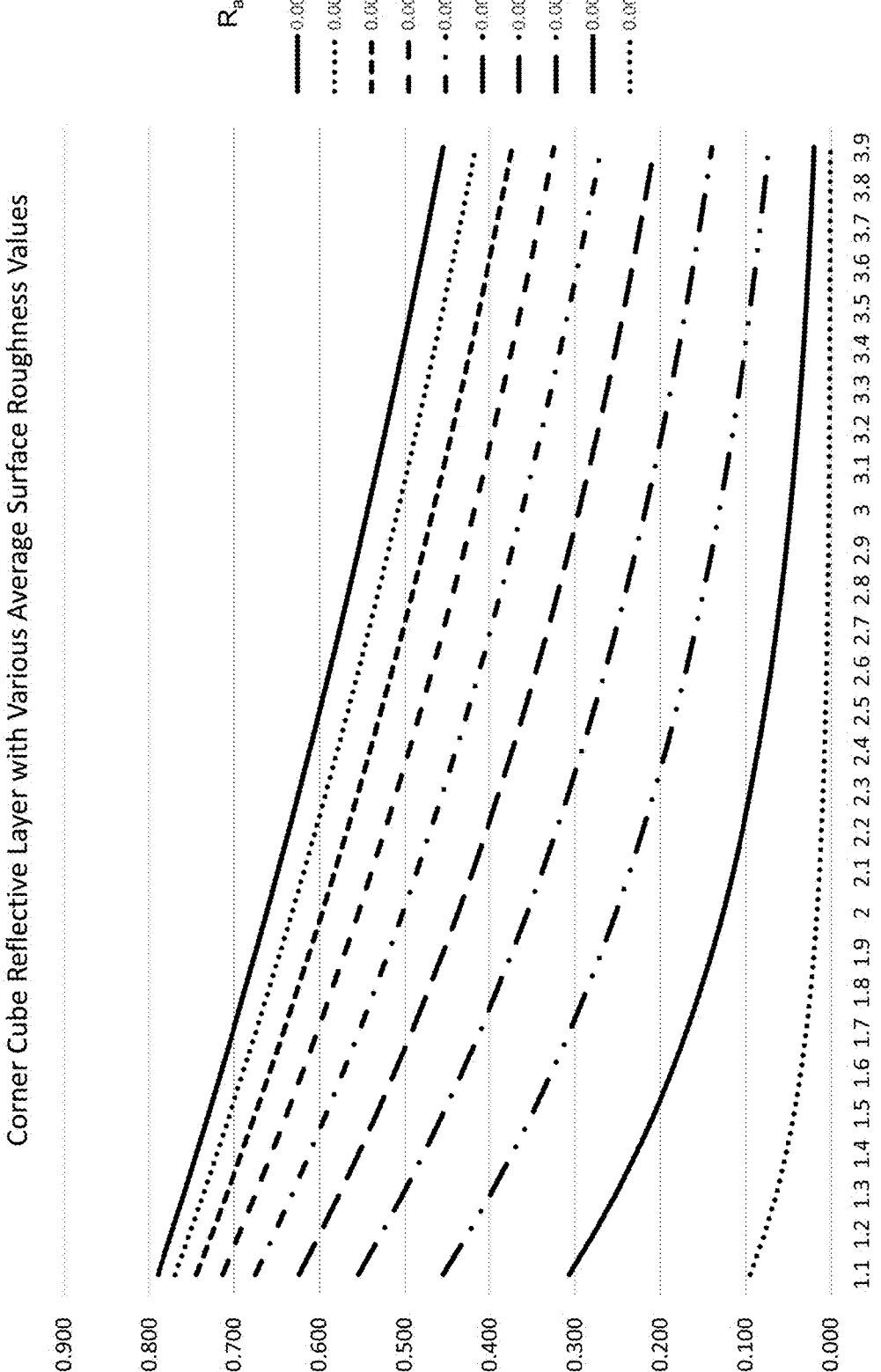
FIG. 8 illustrates transmittance at a reflective boundary verses index of refraction for a corner cube reflective boundary.

As presented previously, corner cube optics percent reflectivity and transmittance is highly dependent on the average roughness of corner cube surfaces. The corner cube transmittance function that corresponds to the data from Table 3 is expressed as:

$$t_{cc} = e^{-(\eta 2 * Kcc)/(\eta 1 * Ravg)} \qquad \text{Eq. 5}$$

Where $\eta_1$ is the index of refraction of an ambient gas $\eta_2$ is the index of refraction of a reflective article material $R_{avg}$ is the average roughness of a corner cube surface $K_{cc}$ is a constant associated with the corner cube geometry FIG. 8 illustrates the corner cube transmittance function for the reflective boundary for various indices of refraction and various corner cube average surface roughness values. The value of $K_{cc}$ is 0.000984 for corner cube optics with a 180° apex axis angle. Numerical values for corner cube transmittance function values from Eq. 5 are listed in Table 4 below:

length radiation, including ultraviolet and even x-rays. The surface of the sun (~5778° K) emits large amounts of both infrared and ultraviolet radiation. Its emission is peaked in the visible spectrum (400-700 nm). This shift due to temperature is called Wien's displacement law. Planck radiation is the greatest amount of radiation that a body at thermal equilibrium can emit from its surface, whatever its chemical composition or surface structure. The passage of radiation across an interface between media can be characterized by the transmittance of the interface (the ratio of the actual radiance to the theoretical Planck radiance), usually denoted by the symbol t. It is in general dependent on chemical composition and physical structure, on temperature, on the

| $R_a$ | $\eta_2$ -> | 1.1 | 1.2 | 1.3 | 1.4 | 1.5 | 1.6 | 1.7 | 1.8 | 1.9 | 2 |
|---|---|---|---|---|---|---|---|---|---|---|---|
| 0.0005 | | 0.115 | 0.094 | 0.077 | 0.064 | 0.052 | 0.043 | 0.035 | 0.029 | 0.024 | 0.020 |
| 0.001 | | 0.339 | 0.307 | 0.278 | 0.252 | 0.229 | 0.207 | 0.188 | 0.170 | 0.154 | 0.140 |
| 0.0015 | | 0.486 | 0.455 | 0.426 | 0.399 | 0.374 | 0.350 | 0.328 | 0.307 | 0.288 | 0.269 |
| 0.002 | | 0.582 | 0.554 | 0.528 | 0.502 | 0.478 | 0.455 | 0.433 | 0.412 | 0.393 | 0.374 |
| 0.0025 | | 0.649 | 0.624 | 0.599 | 0.576 | 0.554 | 0.533 | 0.512 | 0.492 | 0.473 | 0.455 |
| 0.003 | | 0.697 | 0.675 | 0.653 | 0.632 | 0.611 | 0.592 | 0.573 | 0.554 | 0.536 | 0.519 |
| 0.0035 | | 0.734 | 0.714 | 0.694 | 0.675 | 0.656 | 0.638 | 0.620 | 0.603 | 0.586 | 0.570 |
| 0.004 | | 0.763 | 0.744 | 0.726 | 0.709 | 0.691 | 0.675 | 0.658 | 0.642 | 0.627 | 0.611 |
| 0.0045 | | 0.786 | 0.769 | 0.753 | 0.736 | 0.720 | 0.705 | 0.690 | 0.675 | 0.660 | 0.646 |
| 0.005 | | 0.805 | 0.790 | 0.774 | 0.759 | 0.744 | 0.730 | 0.716 | 0.702 | 0.688 | 0.675 |

| $R_a$ | $\eta_2$ -> | 2.1 | 2.2 | 2.3 | 2.4 | 2.5 | 2.6 | 2.7 | 2.8 | 2.9 | 3 |
|---|---|---|---|---|---|---|---|---|---|---|---|
| 0.0005 | | 0.016 | 0.013 | 0.011 | 0.009 | 0.007 | 0.006 | 0.005 | 0.004 | 0.003 | 0.003 |
| 0.001 | | 0.127 | 0.115 | 0.104 | 0.094 | 0.085 | 0.077 | 0.070 | 0.064 | 0.058 | 0.052 |
| 0.0015 | | 0.252 | 0.236 | 0.221 | 0.207 | 0.194 | 0.182 | 0.170 | 0.159 | 0.149 | 0.140 |
| 0.002 | | 0.356 | 0.339 | 0.323 | 0.307 | 0.292 | 0.278 | 0.265 | 0.252 | 0.240 | 0.229 |
| 0.0025 | | 0.438 | 0.421 | 0.404 | 0.389 | 0.374 | 0.359 | 0.346 | 0.332 | 0.319 | 0.307 |
| 0.003 | | 0.502 | 0.486 | 0.470 | 0.455 | 0.440 | 0.426 | 0.412 | 0.399 | 0.386 | 0.374 |
| 0.0035 | | 0.554 | 0.539 | 0.524 | 0.509 | 0.495 | 0.481 | 0.468 | 0.455 | 0.443 | 0.430 |
| 0.004 | | 0.597 | 0.582 | 0.568 | 0.554 | 0.541 | 0.528 | 0.515 | 0.502 | 0.490 | 0.478 |
| 0.0045 | | 0.632 | 0.618 | 0.605 | 0.592 | 0.579 | 0.566 | 0.554 | 0.542 | 0.530 | 0.519 |
| 0.005 | | 0.661 | 0.649 | 0.636 | 0.624 | 0.611 | 0.599 | 0.588 | 0.576 | 0.565 | 0.554 |

| $R_a$ | $\eta_2$ -> | 3.1 | 3.2 | 3.3 | 3.4 | 3.5 | 3.6 | 3.7 | 3.8 | 3.9 | 4 |
|---|---|---|---|---|---|---|---|---|---|---|---|
| 0.0005 | | 0.002 | 0.002 | 0.002 | 0.001 | 0.001 | 0.001 | 0.001 | 0.001 | 0.000 | 0.000 |
| 0.001 | | 0.047 | 0.043 | 0.039 | 0.035 | 0.032 | 0.029 | 0.026 | 0.024 | 0.022 | 0.020 |
| 0.0015 | | 0.131 | 0.123 | 0.115 | 0.107 | 0.101 | 0.094 | 0.088 | 0.083 | 0.077 | 0.073 |
| 0.002 | | 0.218 | 0.207 | 0.197 | 0.188 | 0.179 | 0.170 | 0.162 | 0.154 | 0.147 | 0.140 |
| 0.0025 | | 0.295 | 0.284 | 0.273 | 0.262 | 0.252 | 0.242 | 0.233 | 0.224 | 0.215 | 0.207 |
| 0.003 | | 0.362 | 0.350 | 0.339 | 0.328 | 0.317 | 0.307 | 0.297 | 0.288 | 0.278 | 0.269 |
| 0.0035 | | 0.418 | 0.407 | 0.395 | 0.384 | 0.374 | 0.363 | 0.353 | 0.344 | 0.334 | 0.325 |
| 0.004 | | 0.466 | 0.455 | 0.444 | 0.433 | 0.423 | 0.412 | 0.402 | 0.393 | 0.383 | 0.374 |
| 0.0045 | | 0.508 | 0.497 | 0.486 | 0.475 | 0.465 | 0.455 | 0.445 | 0.436 | 0.426 | 0.417 |
| 0.005 | | 0.543 | 0.533 | 0.522 | 0.512 | 0.502 | 0.492 | 0.483 | 0.473 | 0.464 | 0.455 |

In order to utilize a reflective boundary to control heat transfer through a boundary, it is necessary to incorporate information regarding black body radiation and Planck's Law into the design and selection of material used to create asymmetric reflective boundaries. A black body is an idealized object which absorbs and emits all radiation frequencies. Near thermodynamic equilibrium, the emitted radiation is closely described by Planck's law and because of its dependence on temperature, Planck radiation is said to be thermal radiation, such that the higher the temperature of a body the more radiation it emits at every wavelength. Planck radiation has a maximum intensity at a wavelength that depends on the temperature of the body. For example, at room temperature (~300° K), a body emits thermal radiation that is mostly infrared and invisible. At higher temperatures the amount of infrared radiation increases and can be felt as heat, and more visible radiation is emitted so the body glows visibly red. At higher temperatures, the body is bright yellow or blue-white and emits significant amounts of short wave-wavelength, on the angle of passage, and on the polarization. The transmittance of a natural interface is always between t=0 and 1.

A body that interfaces with another medium which both have t=0 and absorbs all the radiation incident upon it, is said to be a black body. The surface of a black body can be modelled by a small hole in the wall of a large enclosure which is maintained at a uniform temperature with opaque walls that, at every wavelength, are not perfectly reflective. At equilibrium, the radiation inside this enclosure is described by Planck's law, as is the radiation leaving the small hole. Just as the Maxwell-Boltzmann distribution is the unique maximum entropy energy distribution for a gas of material particles at thermal equilibrium, so is Planck's distribution for a gas of photons. By contrast to a material gas where the masses and number of particles play a role, the spectral radiance, pressure and energy density of a photon gas at thermal equilibrium are entirely determined by the temperature. If the photon gas is not Planckian, the second law of thermodynamics guarantees that interactions (between photons and other particles or even, at sufficiently high temperatures, between the photons themselves) will cause the photon energy distribution to change and approach the Planck distribution. In such an approach to thermodynamic equilibrium, photons are created or annihilated in the right numbers and with the right energies to fill the cavity with a Planck distribution until they reach the equilibrium temperature. It is as if the gas is a mixture of sub-gases, one for every band of wavelengths, and each sub-gas eventually attains the common temperature.

Quantum theoretical explanation of Planck's law views the radiation as a gas of massless, uncharged, bosonic particles, namely photons, in thermodynamic equilibrium. Photons are viewed as the carriers of the electromagnetic interaction between electrically charged elementary particles. Photon numbers are not conserved. Photons are created or annihilated in the right numbers and with the right energies to fill the cavity with the Planck distribution. For a photon gas in thermodynamic equilibrium, the internal energy density is entirely determined by the temperature. Every physical body spontaneously and continuously emits electromagnetic radiation and the spectral radiance of a body, $B_\lambda$, describes the amount of energy it emits at different radiation wavelengths. It is the power emitted per unit area of the body, per unit solid angle of emission, per unit wavelength. Planck showed that the spectral radiance of a body for wavelength $\lambda$ at absolute temperature T is given by Eq. 6:

$$B_\lambda(\lambda, T) = \frac{2hc^2}{\lambda^5} \frac{1}{e^{\frac{hc}{\lambda k_B T}} - 1},$$

Where $k_B$ is the Boltzmann constant,
  h is the Planck constant
  c is the speed of light in the medium.

In accordance with Eq. 6, radiated energy emitted at shorter wavelengths increases more rapidly with temperature than energy emitted at longer wavelengths. The law may also be expressed in other terms, such as the number of photons emitted at a certain wavelength, or the energy density in a volume of radiation. The SI units of $B_\lambda$ are $W \cdot sr^{-1} \cdot m^{-3}$.

Figure 9:
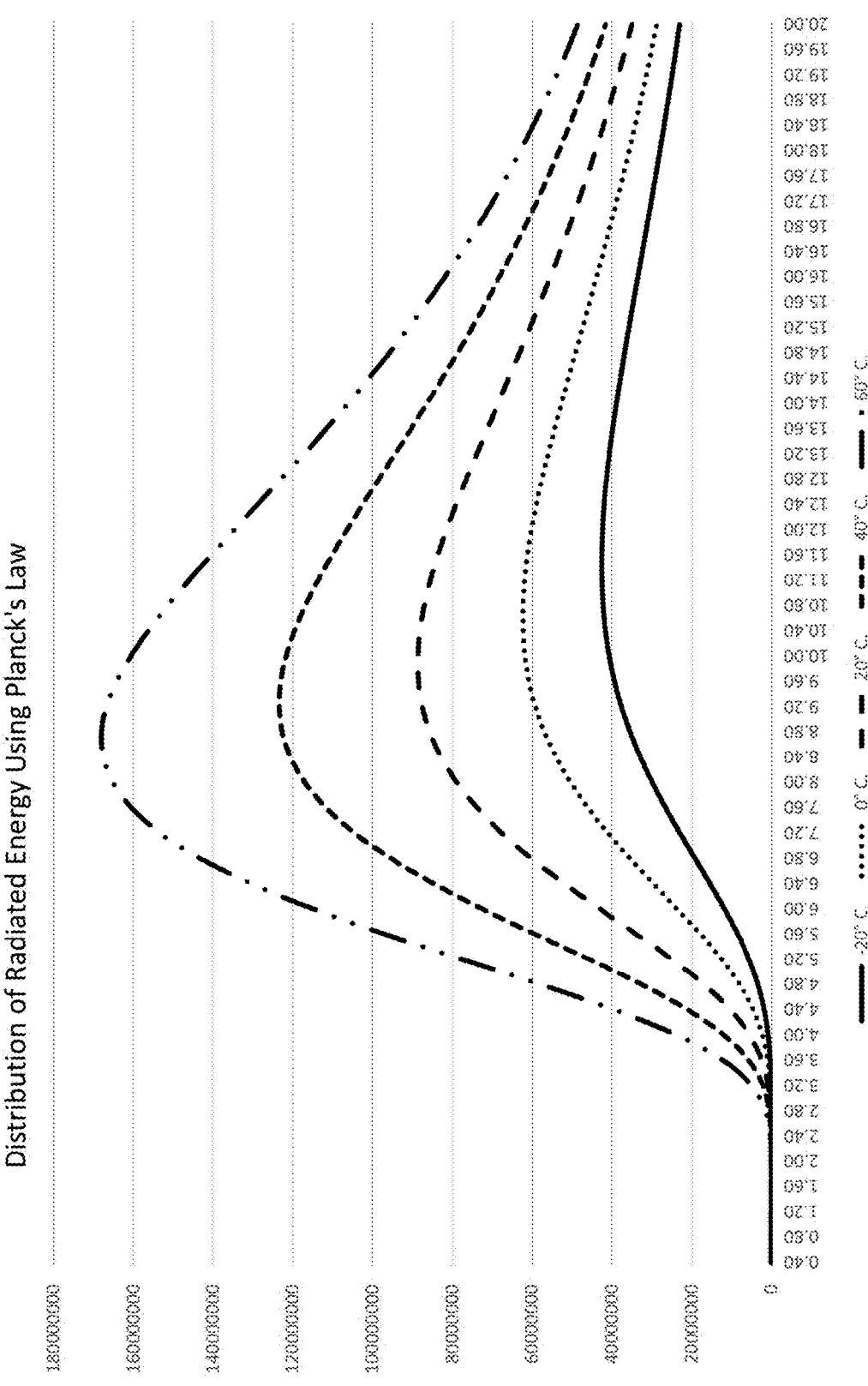
FIG. 9 illustrates a distribution of radiated energy at five temperatures using Planck's Law.

FIG. 9 illustrates the energy density at various wavelengths for Planckian gasses at temperatures of 60° C., 40° C., 20° C., 0° C., and −20° C. It is noteworthy that the wavelength at which the energy distribution is a maximum is 11.2 μm for −20° C., 10.6 μm for 0° C., 9.8 μm for 20° C., 9.3 μm for 40° C., and 8.7 μm for 60° C. It is this relationship of higher-temperature bodies emitting lower-wavelength energies that is exploited with the introduction of asymmetric infrared reflective (AIR) articles.

Figure 10:
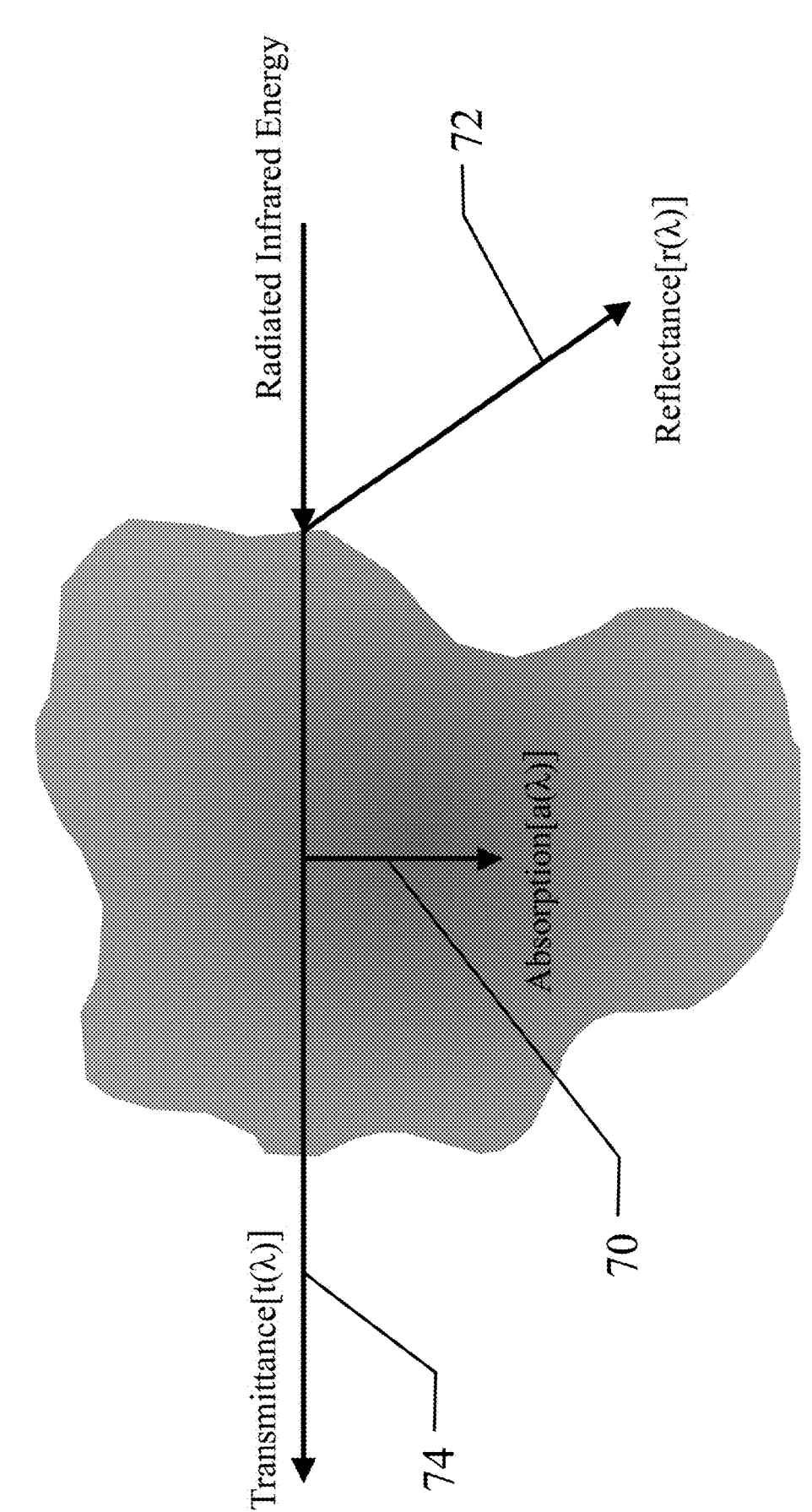
FIG. 10 illustrates absorption, transmittance and reflection of incident radiation by a body.

FIG. 10 illustrates the reflectance, transmittance and absorption properties of an object or a material. When photons radiated by an object or a gas reach another body, a portion of the energy received will be absorbed, a portion will be reflected and if the body is not opaque a portion will be transmitted through. The sum total of the three individual parts must always add up to the initial value of radiation which left the source. For an object or material, the body's wavelength-dependent fractional absorption 70, reflectance 72 and transmittance 74 respectively are expressed as:

$$a(\lambda) + r(\lambda) + t(\lambda) = 1.0 \qquad \text{Eq. 7}$$

where a(λ)=the fractional absorption of energy at wavelength λ
  r(λ)=the fractional reflectance of energy at the surface at wavelength λ
  t(λ)=the fractional transmittance of energy through the material at wavelength λ

If a body is totally non-reflective and completely opaque then all the radiated energy received by the body will be absorbed. This type of body is a perfect absorber and will also be a perfect emitter of radiation. A perfect absorber and hence emitter of energy is referred to as a black body. A black body would not necessarily appear to be black in color as the words black body are a technical term to describe an object capable of absorbing all radiation falling on it and emitting maximum energy for a given temperature. In practice, surfaces of materials are not perfect absorbers and tend to transmit and reflect energy. A non-black body would absorb less energy than a black body under similar conditions and hence would radiate less energy even though it were at the same temperature.

Figure 11:
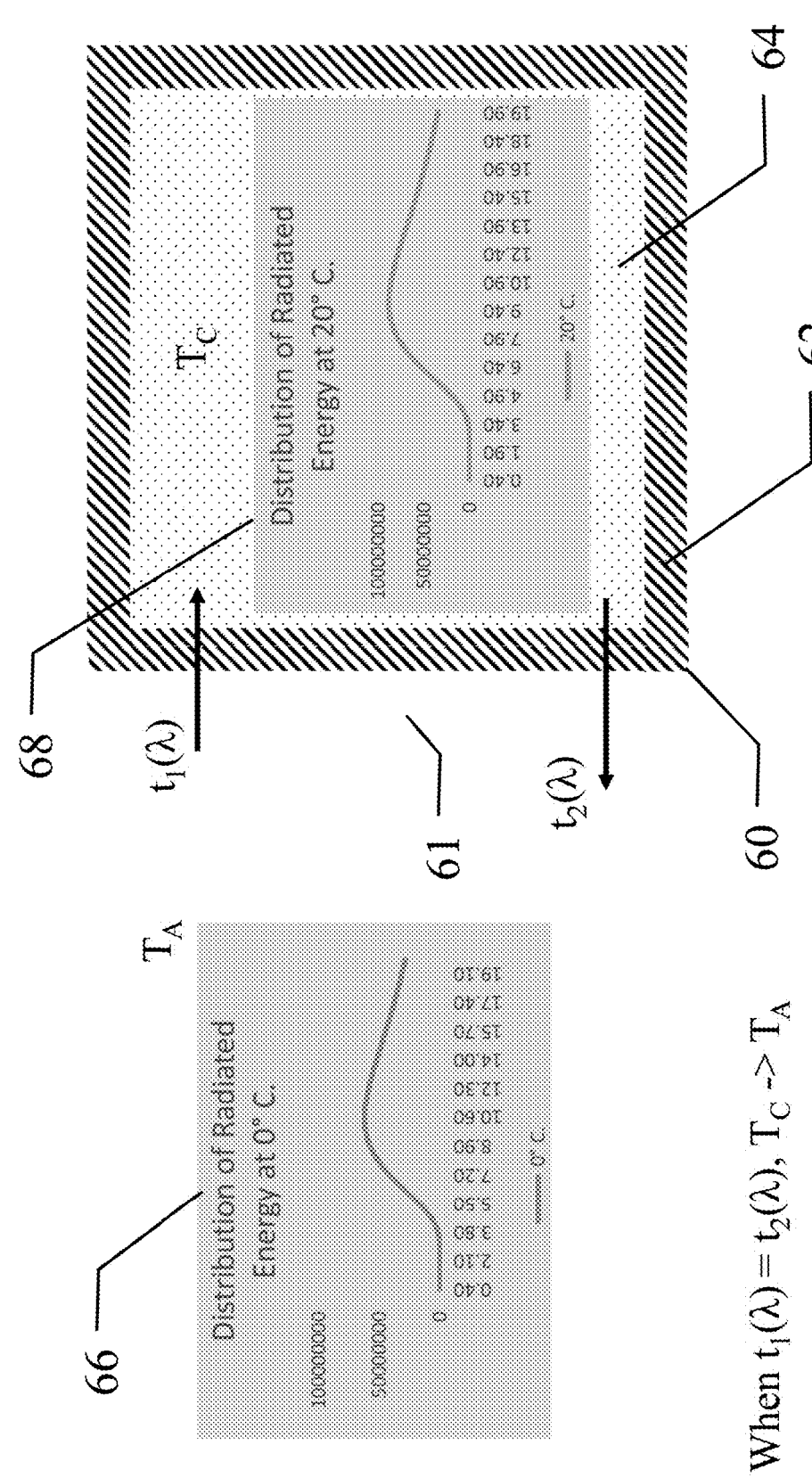
FIG. 11 illustrates thermal equilibrium properties between an enclosed gas and an ambient gas through a barrier exhibiting symmetric IR transmittance.

Radiated energy is a process by which gasses of different temperatures exchange energy until the gasses each reach an equilibrium temperature. To illustrate heat transfer and equilibrium temperatures, FIG. 11 shows two gasses, an ambient gas 61 at an initial temperature of $T_A$=0° C., and a contained gas 64 at an initial temperature of $T_C$=20° C. The contained gas 64 is located within an enclosure 60 consisting of walls 62 made of an ideal material with a transmittance of 1.0. Furthermore, the wall 62 material exhibits bidirectionally-symmetric transmittance, meaning the transmittance $t_1(\lambda)$ from the ambient surface to the contained surface is the same as the transmittance $t_2(\lambda)$ from the contained surface to the ambient surface. A radiated energy distribution 66 is shown for the ambient gas at $T_A$=0° C. and for the radiated energy distribution 68 for the contained gas at an initial temperature of $T_C$=20° C. Energy transmitted from the ambient gas through the wall 62 is absorbed by the contained gas. Likewise, energy transmitted from the contained gas through the wall 62 is absorbed by the ambient gas. As the contained gas emits energy at a density that is higher than the density of the transmitted energy from the ambient gas, the contained gas temperature will decrease because the amount of retained energy in the contained gas is lower than the amount of energy emitted by the contained gas. Equilibrium temperature is reached when the radiated energy distribution of the ambient gas is equivalent to the radiated energy distribution of the contained gas. Said another way, equilibrium temperature is reached when the total energy absorbed by the contained gas is equivalent to the total energy radiated by the contained gas.

Figure 12:
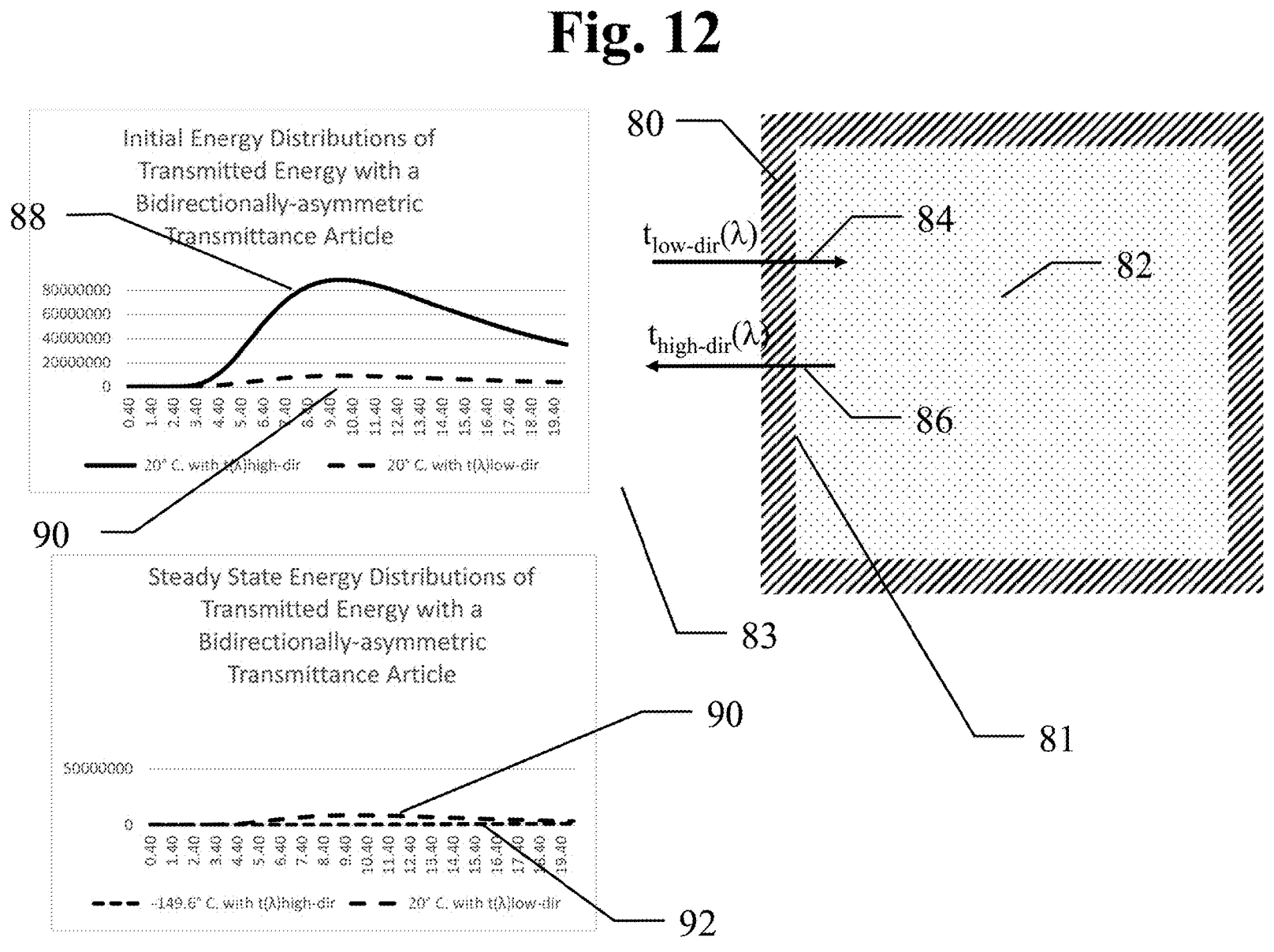

FIG. 12 illustrates an enclosure produced with asymmetric infrared reflective (AIR) article 80 walls to alter the transmission of energy through a material, thus producing unmatched transmittance in opposite directions through an article 80. By utilizing unmatched, asymmetric infrared transmittance, the percentage of radiated energy that enters an enclosed space will be different than the percentage of radiated energy from the enclosed gas 82 that exits the enclosed space through the article 80. The transmittance of the article 80 is 1.0 in the direction of the enclosed gas 82 to the ambient gas 81, and the transmittance of the article is 0.1 in the direction of the ambient gas 81 to the enclosed gas 82. The article 80 is characterized as an ideal article because there is no reflection of energy at the incident boundary, there is no absorption of energy by the material of the article 80, and the transmittance values are consistent for all wavelengths from 400 nm through 100 microns. Furthermore, the material transmittance is 1.0, meaning all radiation that enters the material is transmitted to the opposite material boundary. The article 80 reflective boundary 81 imparts an asymmetric transmittance quality on radiation imparting from the material side and from the enclosed gas side. The low-direction reflective boundary 81 transmittance 84 signifies the article transmittance in the direction from ambient gas 83 to enclosed gas 82 and is denoted by $t_{low-dir}(\lambda)$ while the high-direction transmittance 86 signifies the article transmittance in the direction from enclosed gas 82 to ambient gas 83 and is denoted by $t_{high-dir}(\lambda)$. Assuming both the ambient gas 83 and enclosed gas 82 start at temperatures of 20° C., Planck's formula from Eq. 6 produces an energy distribution 88 that represents the initial radiated energy from the enclosed gas 82 and the ambient gas 83. The energy distribution of the radiated energy that is transmitted through the article 80 with a material transmittance of 1.0 is represented by:

$$B_{transmitted}(\lambda,T)=B_{radiated}(\lambda,T)*t_{reflective-boundary}(\lambda) \qquad \text{Eq. 8}$$

The transmittance at a reflective boundary depends on the index of refraction of the article material, the index of refraction of the contained gas, and the structural makeup of the article reflective boundary. Options for the reflective boundary structural makeup include, but are not limited to, flat, extruded saw-tooth, trihedral corner cube, and metasurfaces.

Eq. 8 concludes that the energy transmitted through a non-absorptive article at each wavelength is the radiated energy from the opposite side of the article multiplied by the transmittance of the reflective boundary 81 of the article 80. Due to the mismatched infrared transmittance values at the reflective boundary 81 of the AIR article with gases 82, 83 at an initial temperature of 20° C., the transmitted energy distributions are different, with the transmitted ambient distribution 88 showing a peak of 88.6M W·sr$^{-1}$·m$^{-3}$ at wavelength of 9.9 microns and a transmitted enclosed distribution 90 showing a peak of 8.86M W·sr$^{-1}$·m$^{-3}$ at wavelength of 9.9 microns. Because the transmitted energy to the enclosed gas 82 is less than the radiated energy from the enclosed gas 82, the enclosed gas 82 temperature will decrease until the radiated energy is equal to the transmitted energy. The Stefan-Boltzmann Law represents the total energy for a radiating body and is expressed as:

$$E=\sigma T^4 \qquad \text{Eq. 9}$$

Where E is energy
σ is the Stefan-Boltzmann constant and is equal to 0.000056704 erg/cm$^2$/K$^4$/sec
T is temperature in degrees Kelvin The steady state temperature ($T_e$) of the enclosed gas 82 is determine by computing the temperature at which the Stefan-Boltzmann energy of the radiating ambient gas equates to the energy radiated from the enclosed gas 82 and is expressed as:

$$T_e = \sqrt[4]{\left( R_E(T)*\int_{0.4}^{100} B(\lambda,\ T.sub.a)d\lambda/\sigma\right)} \qquad \text{Eq. 10}$$

Where σ is the Stefan-Boltzmann constant
$B(\lambda,T_a)$ is the transmitted energy distribution from the ambient gas through the material
$R_E(T)$ is ratio of the total energy of a radiating body to the radiated energy distribution
$R_E(T)$ is 3.157348 at 20° C. for radiating bodies for the wavelength range of 0.4 microns to 100 microns.

For the ideal article with an article transmittance of 1.0 in the direction of enclosed gas 82 to ambient gas 83, a transmittance of 0.1 in the direction of ambient gas 83 to enclosed gas 82, no energy absorption in the article 80, and an ambient temperature of 20° C., Eq. 10 yields a steady state enclosed gas 82 energy distribution 92 at a temperature of −149.6° C. Because the ideal AIR article has no absorption at any wavelength, the steady state article temperature is −273.15° C., or absolute zero.

There are no known materials in existence that have material transmittance values equal to 1.0 for wavelengths from 0.4 microns to 100 microns. Consequently, there are no known materials that do not exhibit some absorption for wavelengths from 0.4 microns to 100 microns. As a result, radiative heating and cooling utilizing AIR articles must account for the effects of material absorption and article temperature increases when computing steady state temperatures. High retroreflectivity articles in the visible spectrum typically utilize reasonably high transmittance for wavelengths in the visible spectrum. The proper functioning of these visible spectrum articles is not dependent on a high material transmittance value. In the visible spectrum, medium transmittance materials will absorb a portion of the visible spectrum energy and convert it to heat energy. The resulting increase in material temperature does not significantly impact the retroreflective performance of the visible spectrum energy at the reflective boundary. In contrast, materials that are used for infrared reflective articles must exhibit high transmittance properties. Photons that do not transmit though a material are absorbed by the material and re-emitted as photons in at thermal wavelengths. An infrared reflective article will emit thermal energy as photons at wavelengths that are determined by the article's temperature. Photonic energy that enters a reflective article at a flat top surface will encounter a reflective boundary at angles that are mostly or completely greater than the critical angle, thus resulting in TIR. Photonic energy due to absorption and re-emission as thermal energy will encounter a reflective boundary at a multitude of angles. Statistically, a higher percentage of the absorbed and re-emitted thermal energy will transport through the reflective boundary than will be reflected by the reflected boundary. Various embodiments of the present disclosure recognize that one way to decrease the effects of thermal transfer though a reflective boundary is to choose high transmittance materials, thus limiting the absorption and re-emission of thermal energy within the article.

Figure 13:
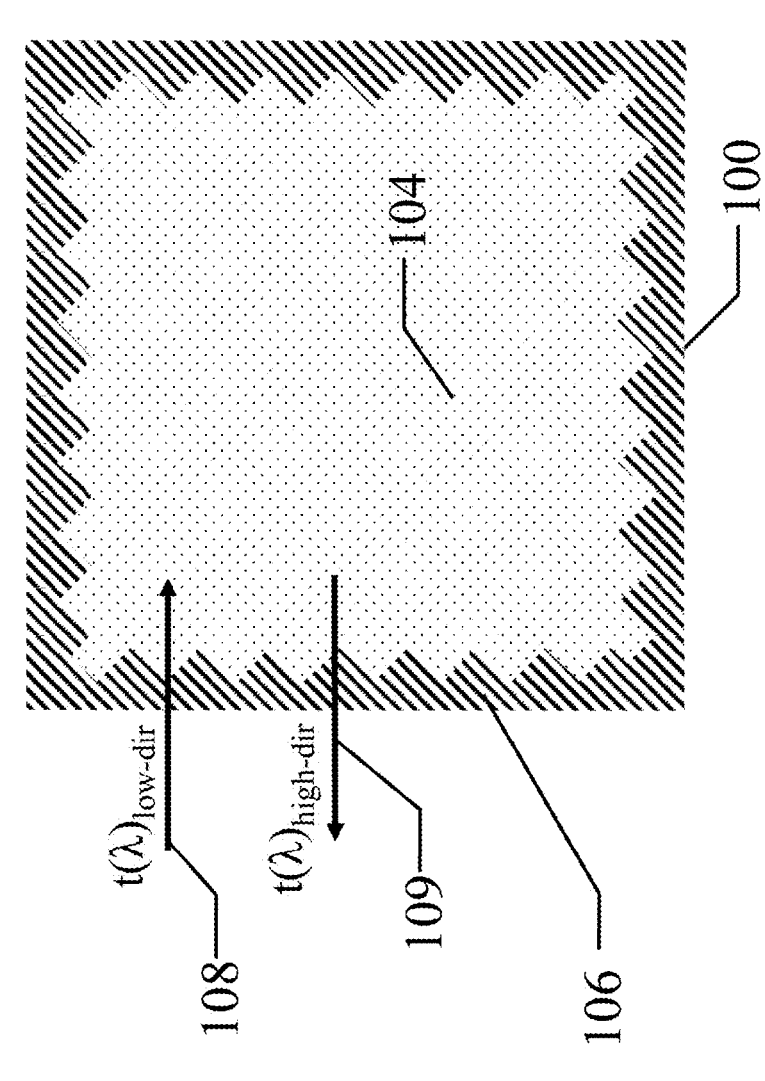
FIG. 13 illustrates an enclosure with walls constructed with flat outer surfaces, corner cube reflective boundaries, with the reflective boundaries exhibiting asymmetric IR transmittance.
Figure 13:
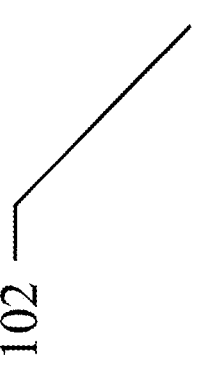

FIG. 13 illustrates an enclosure 100 with walls consisting of articles 106 that have a flat outer surface and a corner cube inner surface as an asymmetric infrared reflective boundary. Because the outer surface is flat and the inner surface is corner cube, the optical layer is oriented to exhibit radiative cooling to the enclosed gas 104. The reflective article 106 is made from a material that has the properties shown in Table 5 below:

| | |
|---|---|
| Material transmittance [$t_m(\lambda)$] for 0.4 < λ < 100 microns | 0.9 |
| Material absorption ($a_m(\lambda)$) for 0.4 < λ < 100 microns | 0.1 |
| Index of refraction ($\eta_m(\lambda)$) for 0.4 < λ < 100 microns | 1.6 |
| Corner cube surface roughness | 0.001 microns |

Initially, the ambient temperature ($T_a$) outside 102 the enclosure 100 is the same as the temperature inside 104 the enclosure ($T_e$), while the material 106 temperature ($T_m$) depends on the absorption properties of the material 106. The initial material 106 temperature is determined by the sum of the absorbed radiated energies from the ambient gas 102 and the enclosed gas 104 and is expressed as:

$$T_m(\text{time} = 0) = \sqrt[4]{\left((1 - t_m(\lambda)) * R_E(T_a) * T_a^4 + (1 - t_m(\lambda)) * R_E(T_e) * \left(T_e^4\right)\right)} \qquad \text{Eq. 11}$$

Where $t_m(\lambda)$ is the transmittance fraction of the material at wavelength $\lambda$ $T_a$ is the ambient gas temperature $R_E(T_a)$ is the ratio of total energy to radiated energy for ambient gas $T_e$ is the enclosed gas temperature $R_E(T_e)$ is the ratio of total energy to radiated energy for enclosed gas In embodiments, the steady state temperature of an enclosed gas 104 in a radiative cooling configuration is determined by the sum of the energy distribution of the ambient gas transmitted through the article in the direction of $t(\lambda)_{low-dir}$ 108 and the energy distribution of the radiated energy from the material due to absorption, minus the energy that escapes the enclosure through the article in the direction of $t(\lambda)_{high-dir}$ 109 and is expressed as:

$$T_e(\text{time} > 0) = \sqrt[4]{\left\{ R_E(T_a) * \left[ t_m(\lambda) * t_{low-dir}(\lambda) * \int_{0.4}^{100} B(\lambda, T.sub.a) d\lambda \right. \right.}$$

$$- t_m(\lambda) * t_{high-dir}(\lambda) * \int_{0.4}^{100} B(\lambda, T.sub.e) d\lambda$$

$$+ (1 - t_m(\lambda)) * \int_{0.4}^{100} B(\lambda, T.sub.a) d\lambda$$

$$\left. \left. + \left(1 - t_m(\lambda) * \int_{0.4}^{100} B(\lambda, T.sub.e) d\lambda \right] \right/ \sigma \right\} \qquad \text{Eq. 12}$$

Where $R_E(T_a)$ is the ratio of total energy to radiated energy for ambient gas $t_m(\lambda)$ is the transmittance of the material at wavelength $\lambda$ $t_{low-dir}(\lambda)$ is the transmittance of the reflective boundary of the article in the low direction at wavelength $\lambda$ $t_{high-dir}(\lambda)$ is the transmittance of the reflective boundary of the article in the high direction at wavelength $\lambda$ $T_a$ is the ambient gas temperature $T_e$ is the enclosed gas temperature $\sigma$ is the Stefan-Boltzmann constant In embodiments, utilizing a radiative cooling enclosed container produced from corner cube reflective boundaries with material properties from Table 5 and an ambient temperature of 20° C., Eq. 11 results in a steady-state material temperature of −37.7° C. and Eq. 12 results in a steady-state enclosed gas temperature of −52.6° C.

Eq. 6 describes the energy density of a Planck gas at various wavelengths and temperatures. Table 6 below illustrates the percentage of total radiated energy for each μm of spectrum for radiated energy produced in accordance with Eq. 6.

TABLE 6

| | Energy percentage for each 1 μm of Spectrum for Radiated Energy | | | | |
|---|---|---|---|---|---|
| | −20° C. | 0° C. | 20° C. | 40° C. | 60° C. |
| 1.0 | 0.0000 | 0.0000 | 0.0000 | 0.0000 | 0.0000 |
| 2.0 | 0.0000 | 0.0000 | 0.0000 | 0.0000 | 0.0000 |
| 3.0 | 0.0001 | 0.0002 | 0.0004 | 0.0007 | 0.0014 |
| 4.0 | 0.0011 | 0.0022 | 0.0041 | 0.0068 | 0.0104 |
| 5.0 | 0.0058 | 0.0098 | 0.0151 | 0.0217 | 0.0294 |
| 6.0 | 0.0154 | 0.0228 | 0.0313 | 0.0407 | 0.0504 |
| 7.0 | 0.0278 | 0.0373 | 0.0471 | 0.0568 | 0.0659 |
| 8.0 | 0.0397 | 0.0494 | 0.0585 | 0.0668 | 0.0738 |
| 9.0 | 0.0488 | 0.0574 | 0.0647 | 0.0707 | 0.0753 |
| 10.0 | 0.0545 | 0.0612 | 0.0664 | 0.0701 | 0.0724 |
| 11.0 | 0.0571 | 0.0618 | 0.0649 | 0.0666 | 0.0672 |
| 12.0 | 0.0571 | 0.0599 | 0.0613 | 0.0615 | 0.0609 |
| 13.0 | 0.0554 | 0.0567 | 0.0567 | 0.0558 | 0.0543 |
| 14.0 | 0.0526 | 0.0526 | 0.0517 | 0.0501 | 0.0481 |
| 15.0 | 0.0492 | 0.0483 | 0.0467 | 0.0446 | 0.0423 |
| 16.0 | 0.0454 | 0.0439 | 0.0418 | 0.0395 | 0.0371 |
| 17.0 | 0.0416 | 0.0397 | 0.0374 | 0.0350 | 0.0325 |
| 18.0 | 0.0380 | 0.0357 | 0.0333 | 0.0309 | 0.0285 |
| 19.0 | 0.0345 | 0.0321 | 0.0297 | 0.0273 | 0.0250 |
| 20.0 | 0.0313 | 0.0288 | 0.0264 | 0.0241 | 0.0220 |
| 21.0 | 0.0283 | 0.0259 | 0.0235 | 0.0214 | 0.0194 |
| 22.0 | 0.0256 | 0.0232 | 0.0210 | 0.0190 | 0.0171 |
| 23.0 | 0.0232 | 0.0209 | 0.0188 | 0.0168 | 0.0151 |
| 24.0 | 0.0210 | 0.0188 | 0.0168 | 0.0150 | 0.0134 |
| 25.0 | 0.0190 | 0.0169 | 0.0150 | 0.0134 | 0.0119 |
| 26.0 | 0.0172 | 0.0152 | 0.0135 | 0.0120 | 0.0106 |
| 27.0 | 0.0156 | 0.0138 | 0.0121 | 0.0107 | 0.0095 |
| 28.0 | 0.0142 | 0.0125 | 0.0109 | 0.0096 | 0.0085 |

TABLE 6-continued

| | Energy percentage for each 1 μm of Spectrum for Radiated Energy | | | | |
|---|---|---|---|---|---|
| | −20° C. | 0° C. | 20° C. | 40° C. | 60° C. |
| 29.0 | 0.0129 | 0.0113 | 0.0099 | 0.0087 | 0.0077 |
| 30.0 | 0.0118 | 0.0102 | 0.0089 | 0.0078 | 0.0069 |
| 31.0 | 0.0107 | 0.0093 | 0.0081 | 0.0071 | 0.0062 |
| 32.0 | 0.0098 | 0.0085 | 0.0074 | 0.0064 | 0.0056 |
| 33.0 | 0.0090 | 0.0077 | 0.0067 | 0.0058 | 0.0051 |
| 34.0 | 0.0082 | 0.0071 | 0.0061 | 0.0053 | 0.0046 |
| 35.0 | 0.0075 | 0.0065 | 0.0056 | 0.0048 | 0.0042 |
| 36.0 | 0.0069 | 0.0059 | 0.0051 | 0.0044 | 0.0038 |
| 37.0 | 0.0064 | 0.0054 | 0.0047 | 0.0040 | 0.0035 |
| 38.0 | 0.0059 | 0.0050 | 0.0043 | 0.0037 | 0.0032 |
| 39.0 | 0.0054 | 0.0046 | 0.0039 | 0.0034 | 0.0029 |
| 40.0 | 0.0050 | 0.0043 | 0.0036 | 0.0031 | 0.0027 |
| 41.0 | 0.0046 | 0.0039 | 0.0034 | 0.0029 | 0.0025 |
| 42.0 | 0.0043 | 0.0036 | 0.0031 | 0.0027 | 0.0023 |
| 43.0 | 0.0040 | 0.0034 | 0.0029 | 0.0025 | 0.0021 |
| 44.0 | 0.0037 | 0.0031 | 0.0027 | 0.0023 | 0.0020 |
| 45.0 | 0.0034 | 0.0029 | 0.0025 | 0.0021 | 0.0018 |
| 46.0 | 0.0032 | 0.0027 | 0.0023 | 0.0020 | 0.0017 |
| 47.0 | 0.0030 | 0.0025 | 0.0021 | 0.0018 | 0.0016 |
| 48.0 | 0.0028 | 0.0023 | 0.0020 | 0.0017 | 0.0014 |

TABLE 6-continued

| Energy percentage for each 1 μm of Spectrum for Radiated Energy | | | | |
| --- | --- | --- | --- | --- |
| −20° C. | 0° C. | 20° C. | 40° C. | 60° C. |
| 49.0 0.0026 | 0.0022 | 0.0018 | 0.0016 | 0.0013 |
| 50.0 0.0024 | 0.0020 | 0.0017 | 0.0015 | 0.0013 |

Figure 14:
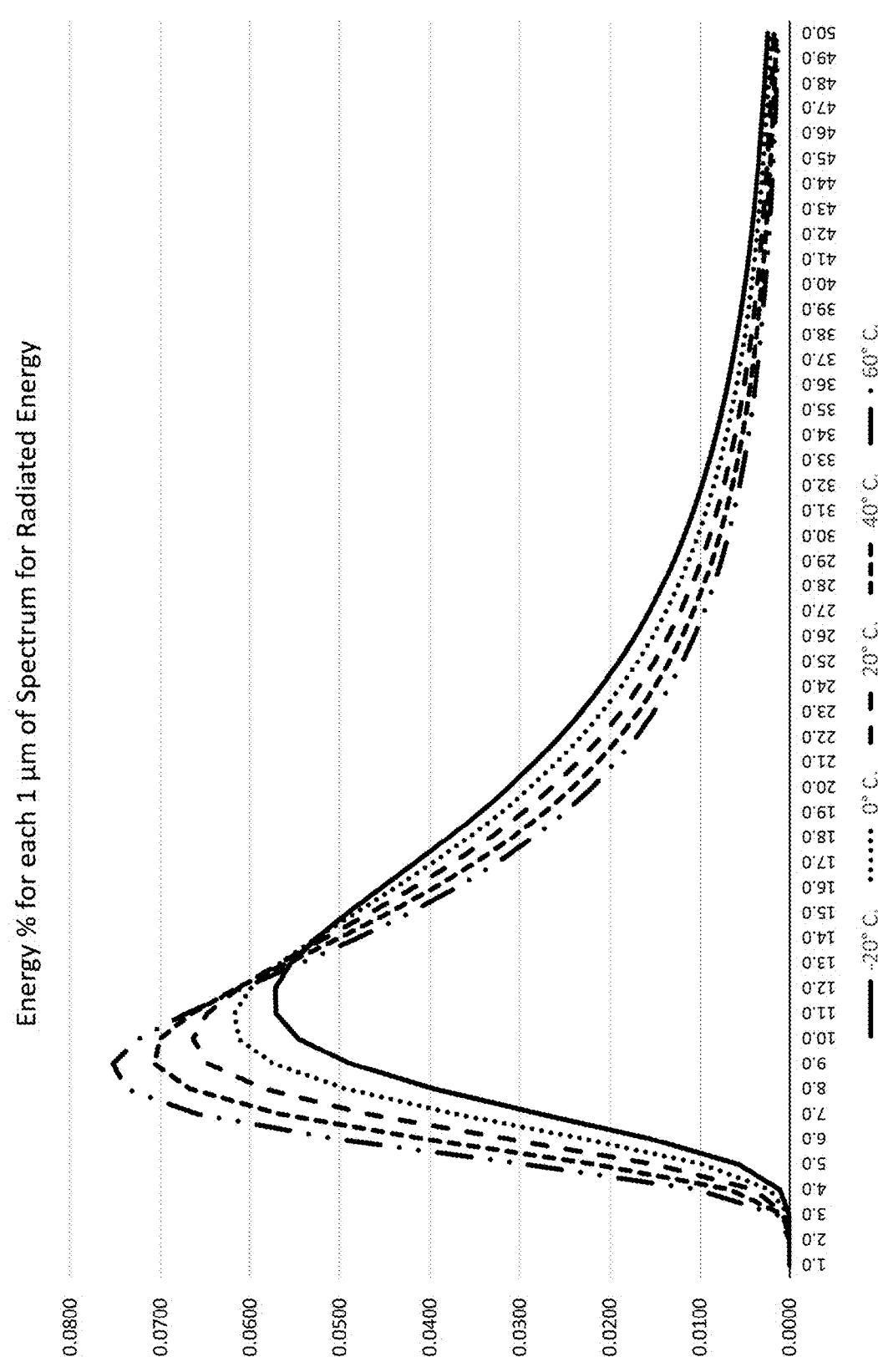
FIG. 14 illustrates the percentage of radiated energy for each 1 μm of spectrum for five temperatures.

FIG. 14 illustrates graphically the energy percentage for each 1 pin of spectrum for radiated energy for Planck gasses at temperatures of −20° C., 0° C., 20° C., 40° C., and 60° C.

Figure 15:
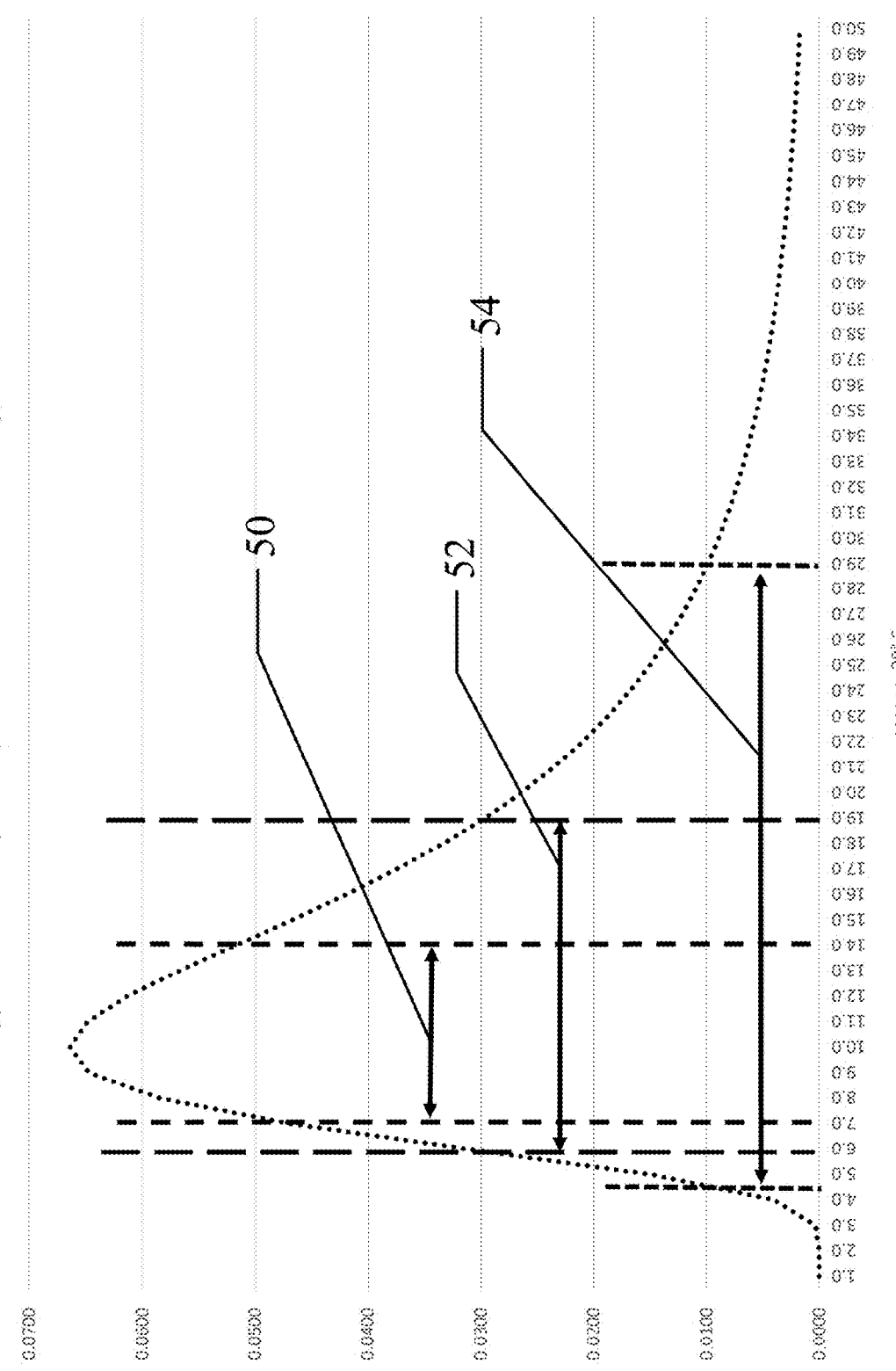
FIG. 15 illustrates wavelength bands for percentage of radiated energy for 20° C.

For each value of λ, the Table 6 value represents the percentage of the radiated energy spectrum that is contained within the 1.0 μm wavelength band for five temperatures around room temperature (20° C.). Table 6 values are used to guide the selection of materials that exhibit high transmittance within an extended wavelength band for materials that also exhibit high indices of refraction throughout a similar wavelength band. FIG. 15 illustrates graphically the energy percentage of radiated energy spectrum for each 1.0 μm wavelength band for a Planck gas at a temperature of 20° C. A 7-14 μm band 50 is shown that represents all wavelength bands whereby the radiated energy is greater than 5% of the cumulative energy function for all wavelengths from 0.4 μm to 100 μm. A 6-19 μm band 52 is shown that represents all wavelength bands whereby the radiated energy is greater than 3% of the cumulative energy function for all wavelengths from 0.4 μm to 100 μm. A 4.5-29 μm band 54 is shown that represents all wavelength bands whereby the radiated energy is greater than 1% of the cumulative energy function for all wavelengths from 0.4 μm to 100 μm.

Utilizing the values from Table 6, it is possible to determine the percentage of radiated spectrum that exists within wavelength bands at various temperatures. Table 7 below shows the percentage of radiated energy that exists for the bands 7-14 μm, 6-19 μm, and 4.5-29 μm for Planck gasses at temperatures of −20° C., 0° C., 20° C., 40° C., and 60° C.

TABLE 7

| Percentage of Radiated Spectrum Energy within Wavelength Ranges | | | | |
| --- | --- | --- | --- | --- |
| | −20° C. | 0° C. | 20° C. | 40° C. | 60° C. |
| 7-14 μm | 39.31% | 43.63% | 47.13% | 49.84% | 51.79% |
| 6-19 μm | 61.72% | 65.88% | 69.16% | 71.63% | 73.38% |
| 4.5-29 μm | 83.24% | 85.81% | 87.88% | 89.55% | 90.89% |

In embodiments, AIR articles produced with a flat top surface and corner cube bottom surfaces utilize materials that have a medium index of refraction ($\eta_m(\lambda) > 1.6$) for wavelengths from 4 μm to 40 μm and have high material transmittance ($t_m(\lambda) > 0.85$) for wavelengths from 4 μm to 40 μm. In embodiments, a material that meets this refractive index threshold and meets this material transmittance threshold is Cesium Iodide, CsI.

Table 8 below illustrates the index of refraction versus wavelength and the transmittance versus wavelength for CsI.

| λ (μm) | $\eta_m(\lambda)$ | $t_m(\lambda)$ |
| --- | --- | --- |
| 0.4 | 1.821 | 0.770 |
| 1 | 1.758 | 0.870 |
| 2 | 1.747 | 0.871 |

-continued

| λ (μm) | $\eta_m(\lambda)$ | $t_m(\lambda)$ |
| --- | --- | --- |
| 3 | 1.744 | 0.871 |
| 5 | 1.743 | 0.872 |
| 10 | 1.74 | 0.875 |
| 15 | 1.735 | 0.878 |
| 20 | 1.728 | 0.881 |
| 25 | 1.719 | 0.883 |
| 30 | 1.708 | 0.886 |
| 35 | 1.695 | 0.889 |
| 40 | 1.678 | 0.850 |
| 45 | 1.659 | 0.756 |
| 50 | 1.637 | 0.580 |
| 55 | 1.611 | 0.34 |

Figure 16:
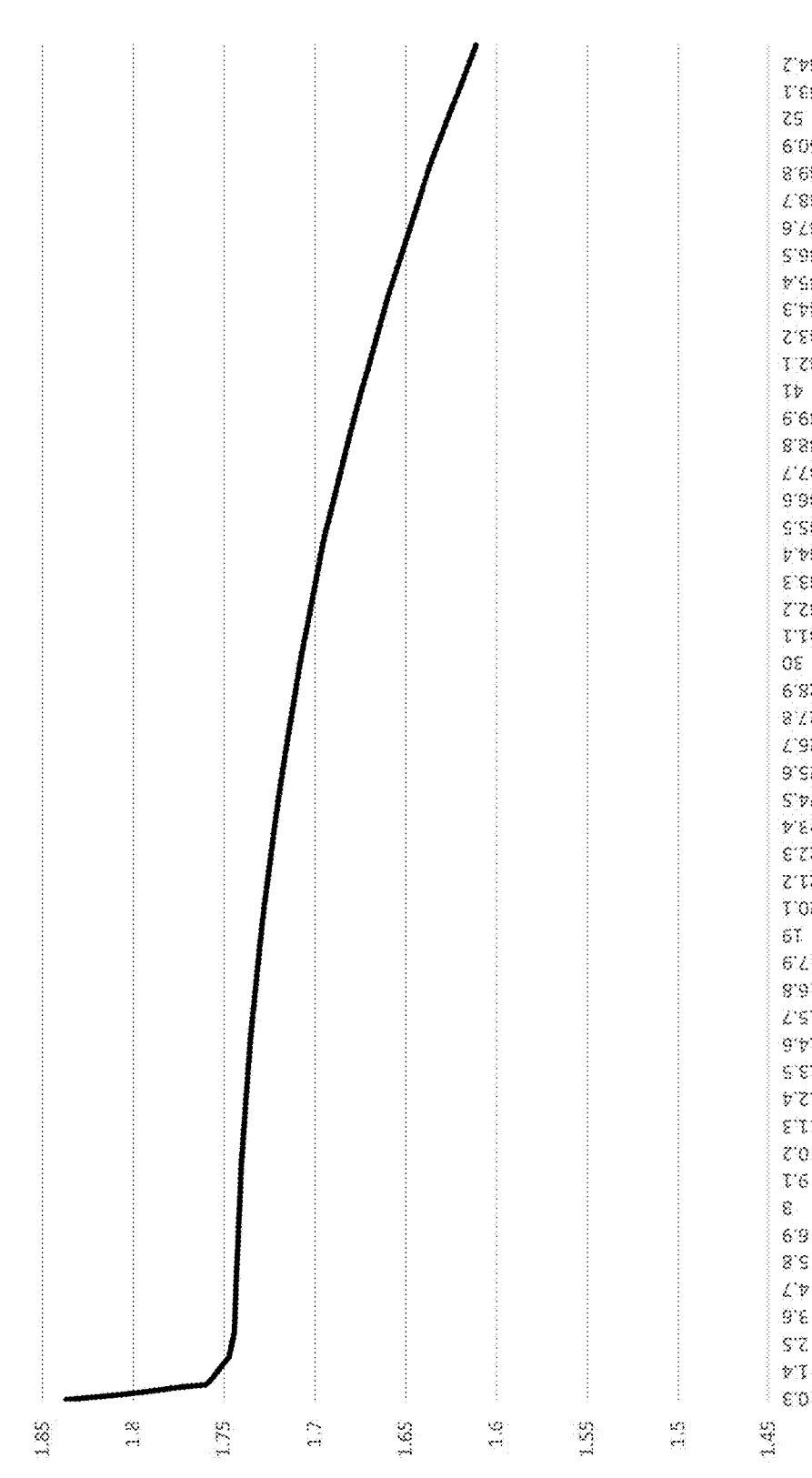
FIG. 16 illustrates the index of refraction verses wavelength for Cesium Iodide (CsI).
Figure 17:
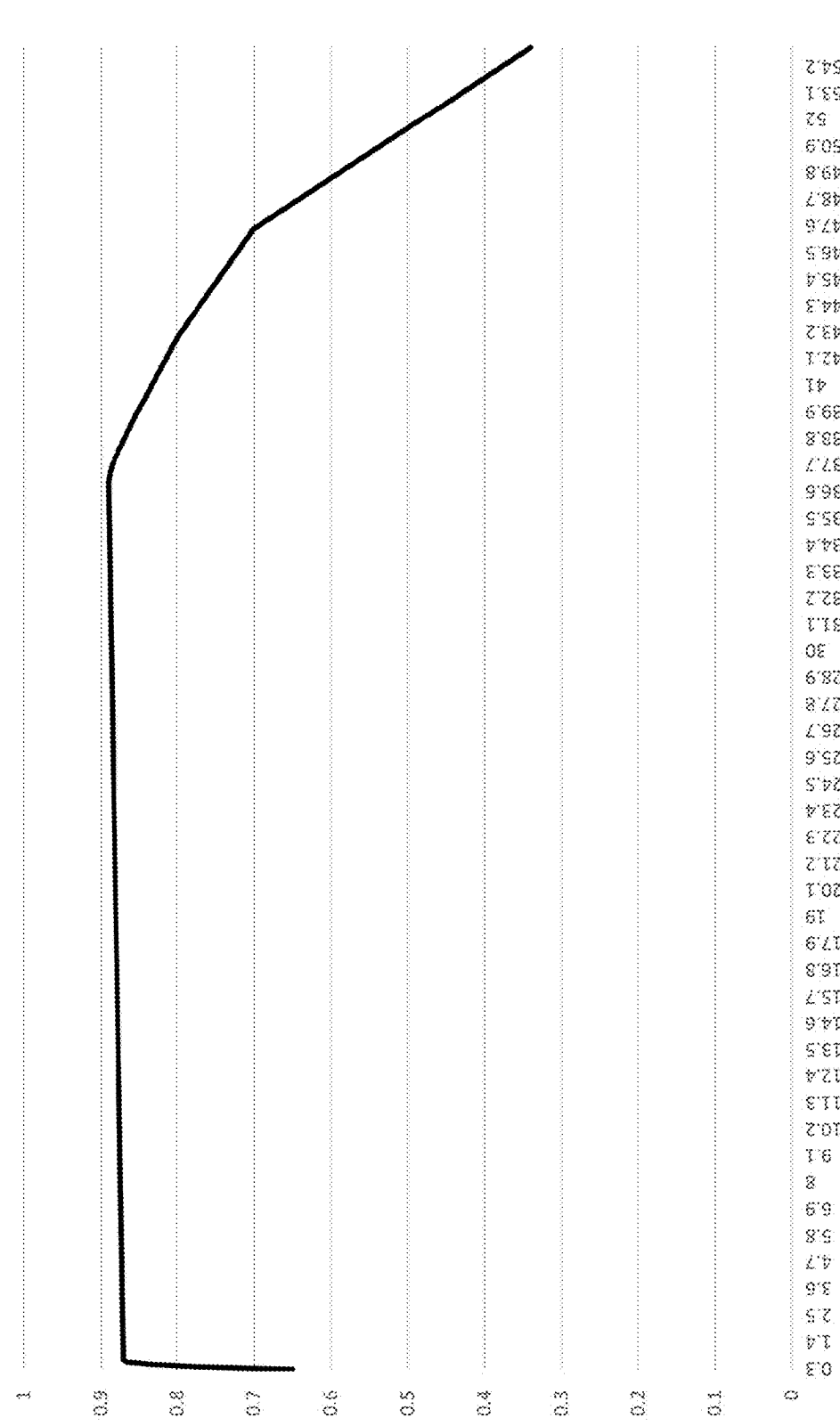
FIG. 17 illustrates the transmittance verses wavelength for Cesium Iodide (CsI).

FIG. 16 graphically illustrates the index of refraction versus wavelength for CsI, and FIG. 17 graphically illustrates the transmittance versus wavelength for CsI.

By utilizing the Eqs. 5, 6, 11 and 12 the steady state temperature of an enclosed gas contained within a radiative cooling enclosure made of CsI corner cube reflective boundaries and flat outer surfaces, whereby the ambient temperature outside the enclosure is 20° C., is computed for various corner cube average surface roughness values in Table 9 below:

Steady-state Temp. for Radiative Cooling CsI Corner Cube Enclosed Gas at 20° C. Ambient Temp.

| Corner Cube $R_a$ (μm) | Steady-state Temp. (° C.) |
| --- | --- |
| 0.0005 | −73.9 |
| 0.001 | −45.8 |
| 0.005 | 11.1 |
| 0.01 | 20 |

Figure 18:
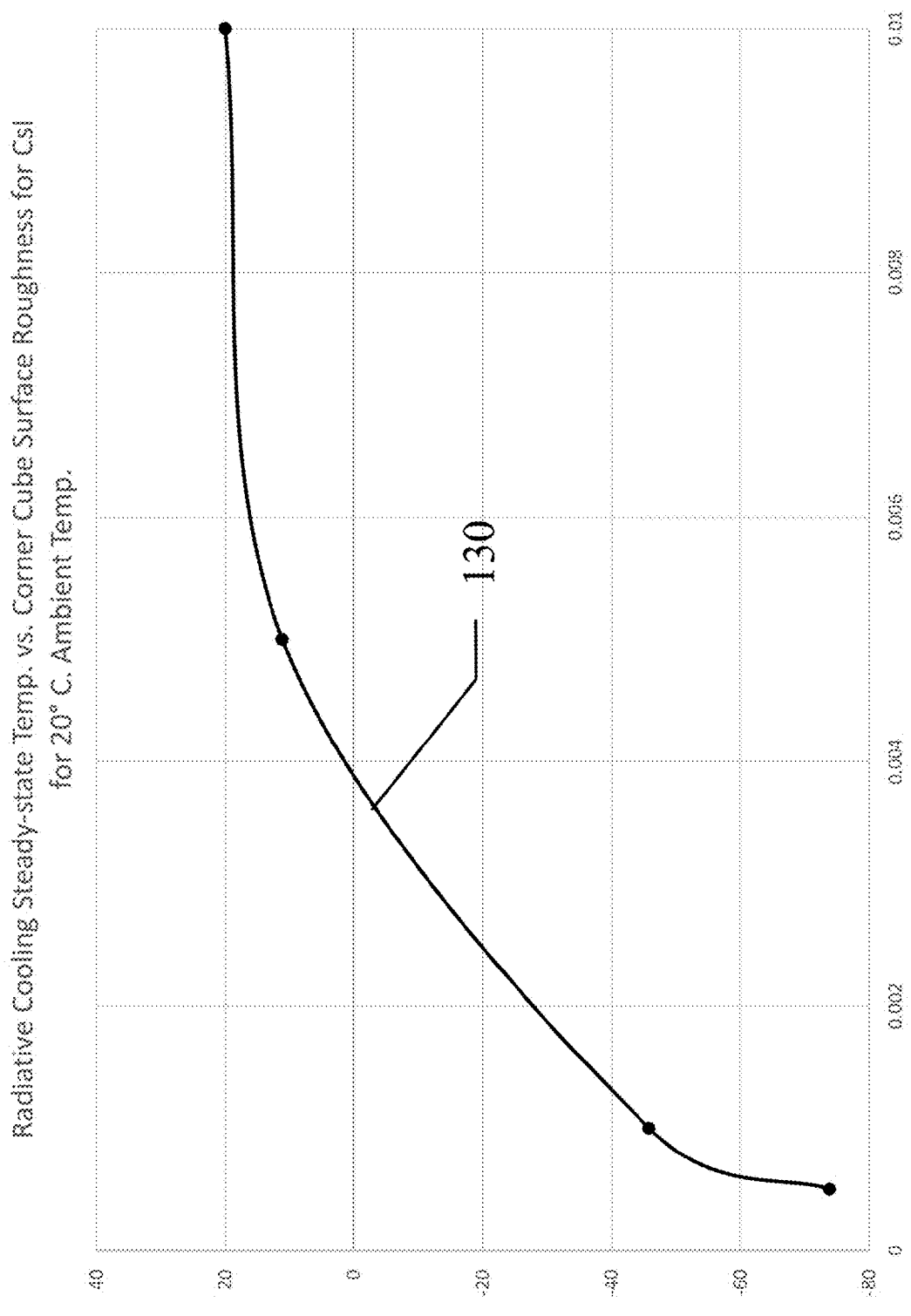
FIG. 18 illustrates the radiative cooling steady-state temperature versus corner cube surface roughness for Cesium Iodide with an ambient temperature of 20° C.

FIG. 18 graphically illustrates the information from Table 9 for a steady state enclosed gas temperature 130 at various corner cube surface roughness values for an asymmetric infrared reflective article container with an ambient temperature of 20° C.

In embodiments, various compounds exist that exhibit high transmittance values ($t_m(\lambda) > 0.8$) and either medium ($\eta_m > 1.6$) or high ($\eta_m > 2.1$) indices of refraction over the wavelength ranges of 7-14 μm, 6-19 μm, or 4.5-29 μm. According to:

According to Jeffrey L. Tosi, et al., "Common Infrared Optical Materials and Coatings: A Guide to Properties, Performance, and Applications" (Photonics Marketplace Handbook), some compounds that meet the criteria include, but are not limited to:

Cadmium Telluride (CdTe)
  Material transmittance range for $t_m(\lambda) > 0.8 \rightarrow 1$ to 25 μm
  Material index of refraction
  $\eta_m(\lambda) = 2.693$ @4 μm
  $\eta_m(\lambda) = 2.676$ @10 μm
  $\eta_m(\lambda) = 2.640$ @19 μm
Cesium Bromide (CsBr)
  Material transmittance range for $t_m(\lambda) > 0.8 \rightarrow 0.35$ to 32 μm.
  Material index of refraction
  $\eta_m(\lambda) = 1.668$ @4 μm
  $\eta_m(\lambda) = 1.663$ @10 μm
  $\eta_m(\lambda) = 1.629$ @25 μm
Gallium Arsenide (GaAs)
  Material transmittance range for $t_m(\lambda) > 0.8 \rightarrow 2$ to 15 μm
  Index of Refraction
  $\eta_m(\lambda) = 3.307$ @4 μm
  $\eta_m(\lambda) = 3.278$ @10 μm
  $\eta_m(\lambda) = 3.251$ @14 μm Germanium (Ge)

Material transmittance range for $t_m(\lambda)>0.8 \rightarrow 2$ to 14 μm

Index of Refraction $\eta_m(\lambda)=4.03$ @4 μm $\eta_m(\lambda)=4.00$ @10 μm

Potassium Bromide (KBr)

Material transmittance range for $t_m(\lambda)>0.8 \rightarrow 0.3$ to 23 μm

Index of Refraction $\eta_m(\lambda)=1.54$ @4 μm $\eta_m(\lambda)=1.53$ @10 μm $\eta_m(\lambda)=1.49$ @20 μm Potassium Chloride (KCl)

Material transmittance range for $tm(\lambda)>0.8 \rightarrow 0.3$ to 21 μm

Index of Refraction $\eta_m(\lambda)=1.47$ @4 μm $\eta_m(\lambda)=1.46$ @10 μm $\eta_m(\lambda)=1.43$ @16 μm Zinc Selenide (ZnSe)

Material transmittance range for $tm(\lambda)>0.8 \rightarrow 0.6$ to 16 μm

Index of Refraction $\eta_m(\lambda)=2.43$ @4 μm $\eta_m(\lambda)=2.41$ @10 μm

Chalcogenide Glass is a class of compounds containing one or more chalcogens (sulfur, selenium and tellurium, but excluding oxygen). Chalcogenide glass for optical uses in IR are typically produced with mixtures of Germanium (Ge), Arsenic (As), Selenium (Se), Tellurium (Te) and Antimony (Sb). The material transmittance range for $tm(A)>0.8$ is 1.0 to 14 μm. Various formulations (A through D) of chalcogenide glass for optical uses in IR are highlighted below, showing the various indices of refraction.

| | Form. A | Form. B | Form. C | Form. D |
|---|---|---|---|---|
| Ge % | 30% | 10% | 28% | |
| As % | 13% | 40% | | 40% |
| Se % | 32% | 50% | 60% | 60% |
| Te % | 25% | | | |
| Sb % | | | 12% | |
| IoR @ 4 μm | 2.80 | 2.62 | 2.62 | 2.79 |
| IoR @ 10 μm | 2.79 | 2.61 | 2.60 | 2.78 |

In embodiments, utilizing the high-IR-transmittance materials presented herein for radiative cooling AIR articles at various corner cube average surface roughness values with 20° C. ambient temperature yields steady state enclosed gas temperatures as shown in Table 10 below.

| | CsI | CdTe | CsBr | Chal G | GaAs | Ge | KBr | KCl | ZnSe |
|---|---|---|---|---|---|---|---|---|---|
| $R_a = 0.0005$ | −73.9 | −40.8 | −50.4 | −5.1 | −10.2 | −5.2 | −36.6 | −32 | −14.7 |
| $R_a = 0.001$ | −45.8 | −31.8 | −40.2 | 0.4 | −4.2 | 0.4 | −28.2 | −24 | −8.6 |
| $R_a = 0.005$ | 11.1 | 16.8 | 12.8 | 19.8 | 19.7 | 19.8 | 18.6 | 19.6 | 19.8 |
| $R_a = 0.01$ | 20 | 20 | 20 | 20 | 20 | 20 | 20 | 20 | 20 |

Figure 19:
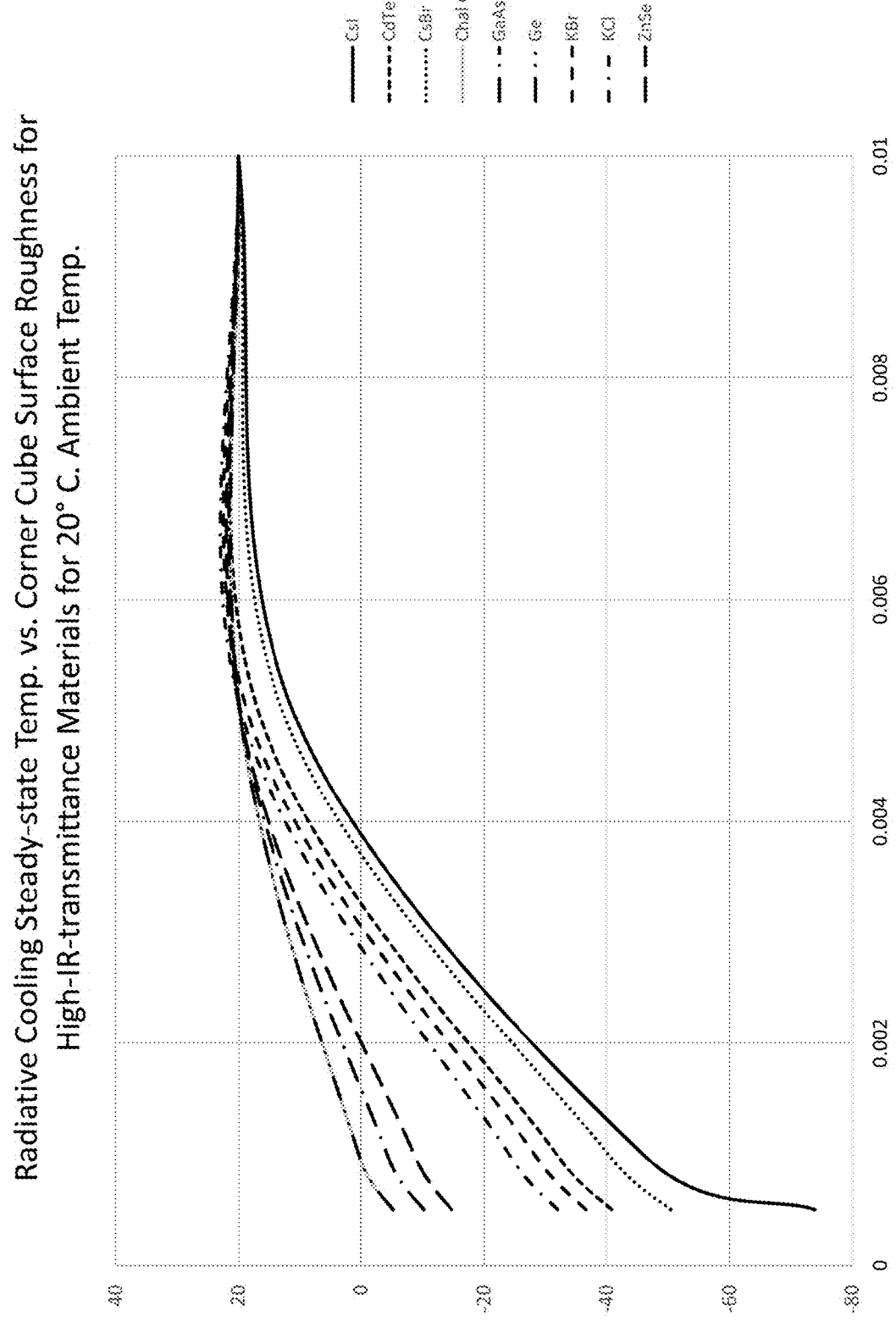
FIG. 19 illustrates radiative cooling steady-state temperatures versus corner cube surface roughness for various materials with an ambient temperature of 20° C.

FIG. 19 graphically illustrates the information from Table 10 for a steady state enclosed gas temperature at various corner cube surface roughness values for a radiative cooling AIR article container produced with various high-IR-transmittance materials, with the container placed within an ambient temperature of 20° C.

Figure 20:
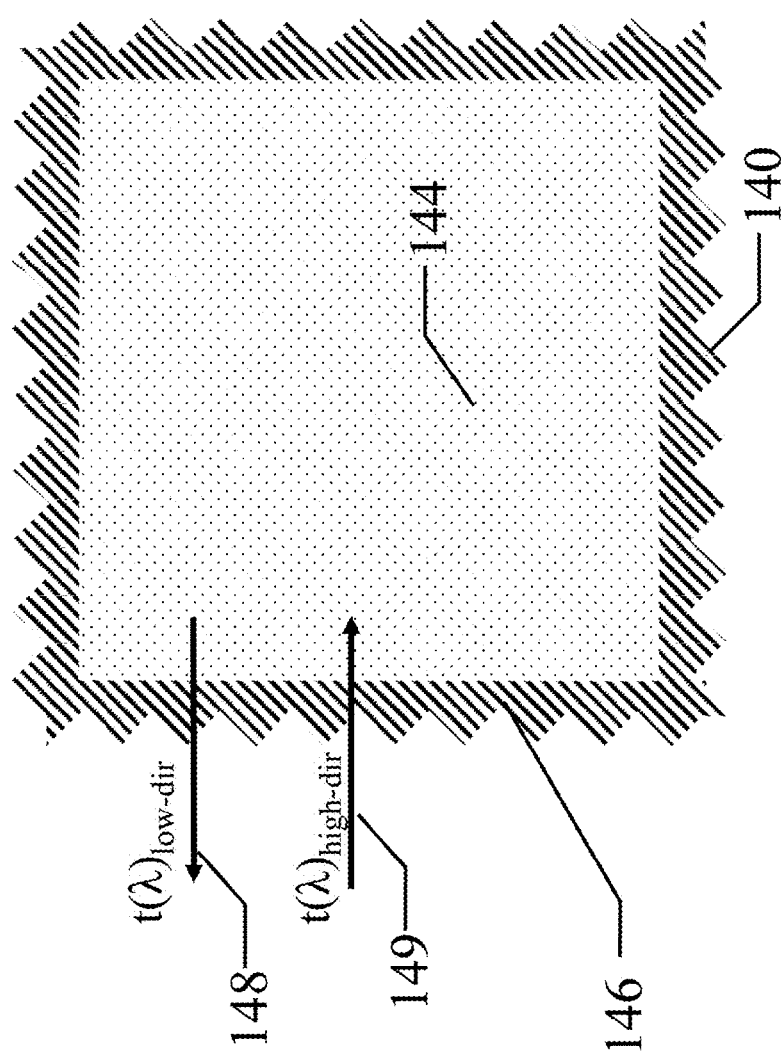
FIG. 20 illustrates an enclosure with walls constructed with flat inner surfaces, corner cube reflective boundaries, with the reflective boundaries exhibiting asymmetric IR transmittance.

FIG. 20 illustrates an enclosure 140 with walls constructed from articles 146 that have a flat inner surface and a corner cube reflective boundary. Because the inner surface is flat and the reflective boundary is corner cube, the article 146 is oriented to exhibit radiative heating to the enclosed gas 144. In embodiments, the steady state temperature of an enclosed gas 144 in a radiative heating configuration is determined by the sum of the energy distribution of the ambient gas 142 transmitted through the article in the direction of $t_{high\text{-}dis}(\lambda)$ 149 and the energy distribution of the radiated energy from the material due to absorption, minus the energy that escapes the enclosure through the article in the direction of $t_{low\text{-}dir}(\lambda)$ 148 and is expressed as:

$$T_e(\text{time} > 0) = \sqrt[4]{\left\{ R_E(T_a) * \left[ t_m(\lambda) * t_{high\text{-}dir}(\lambda) * \int_{0.4}^{100} B(\lambda,\, T.sub.a)d\lambda \right. \right.}$$

$$- t_m(\lambda) * t_{low\text{-}dir}(\lambda) * \int_{0.4}^{100} B(\lambda,\, T.sub.e)d\lambda$$

$$+ (1 - t_m(\lambda)) * \int_{0.4}^{100} B(\lambda,\, T.sub.a)d\lambda$$

$$\left. \left. + \left( 1 - t_m(\lambda) * \int_{0.4}^{100} B(\lambda,\, T.sub.e)d\lambda \right) \right] / \sigma \right\}$$

Eq. 13

Where $R_E(T_a)$ is the ratio of total energy to radiated energy for ambient gas $t_m(\lambda)$ is the transmittance of the material at wavelength $\lambda$ $t_{low\text{-}dir}(\lambda)$ is the transmittance of the reflective boundary of the article in the low direction at wavelength $\lambda$ $t_{high\text{-}dir}(\lambda)$ is the transmittance of the reflective boundary of the article in the high direction at wavelength $\lambda$ $T_a$ is the ambient gas temperature $T_e$ is the enclosed gas temperature $\sigma$ is the Stefan-Boltzmann constant In embodiments, utilizing a radiative heating enclosed container produced from corner cube reflective boundaries with Cesium Iodide (CsI) with a surface roughness of 0.001 microns and an ambient temperature of 20° C., Eq. 11 results in a steady-state material temperature of 50.5° C. and Eq. 13 results in a steady-state enclosed gas temperature of 85.8° C.

By utilizing the Eqs. 5, 6, 11 and 13 the steady state temperature of an enclosed gas contained within a radiative heating enclosure made of CsI corner cube reflective boundaries and flat inner surfaces, whereby the ambient temperature outside the enclosure is 20° C., is computed for various corner cube average surface roughness values in Table 11 below:

Steady-State Temp. For Radiative Heating CsI Corner Cube Enclosed Gas at 20° C. Ambient Temp.

| Corner Cube $R_a$ (µm) | Steady-state Temp. (° C.) |
|---|---|
| 0.0005 | 113.9 |
| 0.001 | 85.8 |
| 0.005 | 28.9 |
| 0.01 | 20 |

Figure 21:
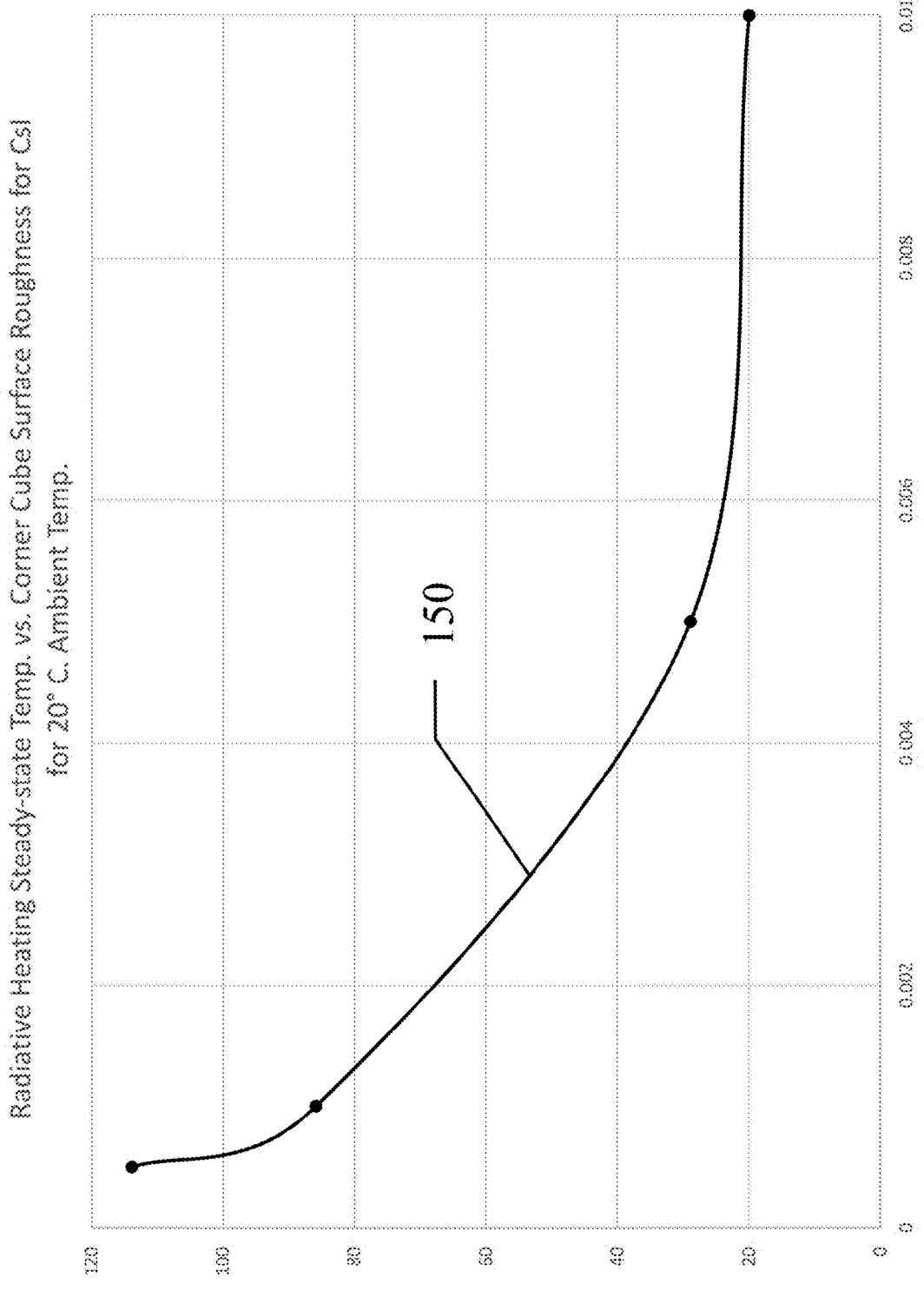
FIG. 21 illustrates the radiative heating steady-state temperature versus corner cube surface roughness for Cesium Iodide with an ambient temperature of 20° C.

FIG. 21 graphically illustrates the information from Table 11 for a steady state enclosed gas temperature 150 at various corner cube surface roughness values for an asymmetric infrared reflective article container with an ambient temperature of 20° C.

In embodiments, utilizing the high-IR-transmittance materials presented herein for radiative heating AIR articles at various corner cube average surface roughness values with 20° C. ambient temperature yields steady state enclosed gas temperatures as shown in Table 12 below.

| | CsI | CdTe | CsBr | Chal G | GaAs | Ge | KBr | KCl | ZnSe |
|---|---|---|---|---|---|---|---|---|---|
| $R_a$ = 0.0005 | 113.9 | 80.8 | 90.4 | 45.1 | 50.2 | 45.2 | 76.6 | 72 | 54.7 |
| $R_a$ = 0.001 | 85.8 | 71.8 | 80.2 | 39.6 | 44.2 | 39.6 | 68.2 | 64 | 48.6 |
| $R_a$ = 0.005 | 28.9 | 23.2 | 27.2 | 20.2 | 20.3 | 20.2 | 21.4 | 20.4 | 20.2 |
| $R_a$ = 0.01 | 20 | 20 | 20 | 20 | 20 | 20 | 20 | 20 | 20 |

Figure 22:
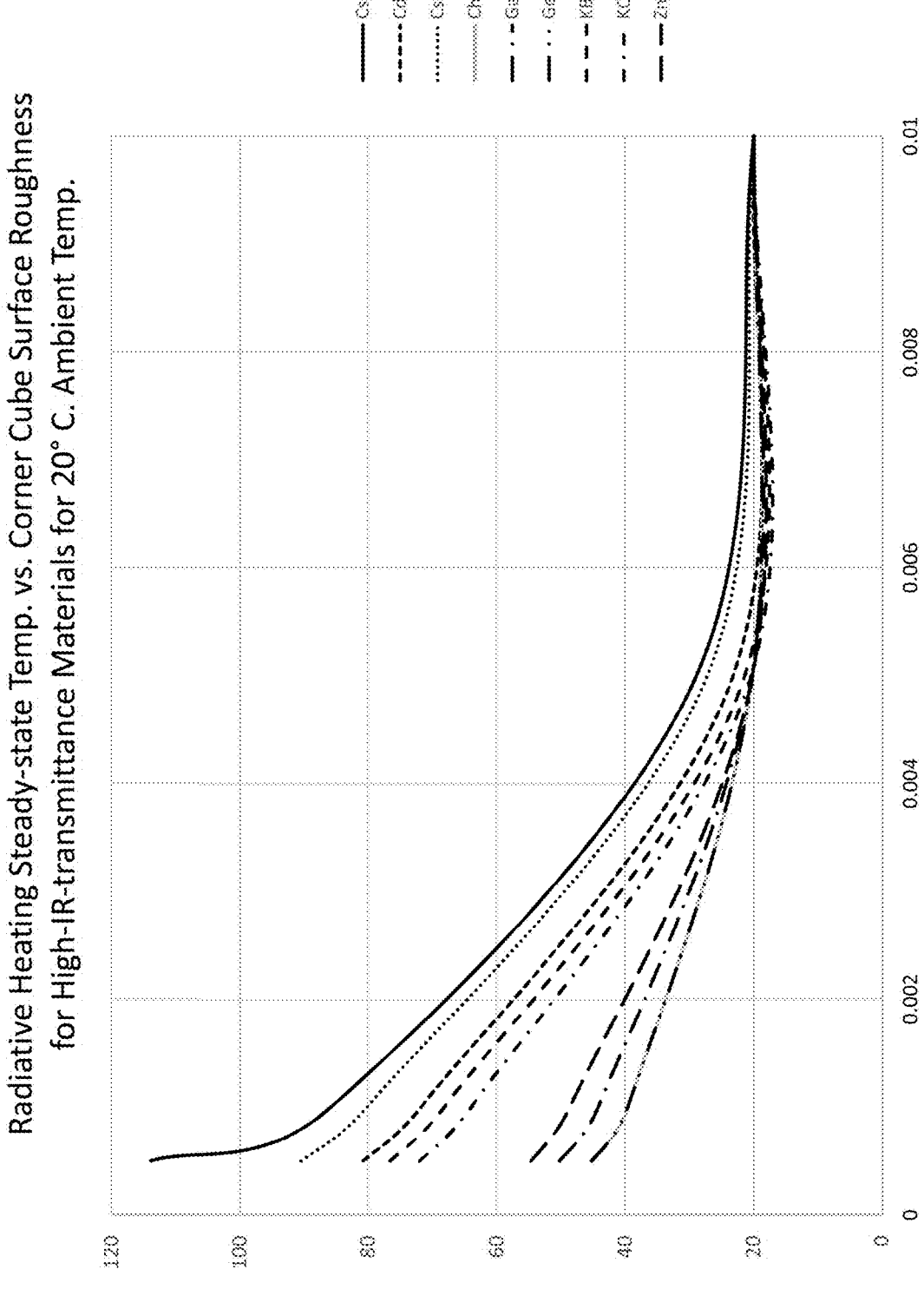
FIG. 22 illustrates radiative heating steady-state temperatures versus corner cube surface roughness for various materials with an ambient temperature of 20° C.

FIG. 22 graphically illustrates the information from Table 12 for a steady state enclosed gas temperature at various corner cube surface roughness values for a radiative heating AIR article container produced with various high-IR-transmittance materials, with the container placed within an ambient temperature of 20° C.

The sun, which acts like a blackbody radiation element with a surface temperature of 5778° K., produces a solar irradiance spectrum at the earth's surface in accordance with the values listed in Table 13 below:

| Wavelength (µm) | Irradiance (W/m2/nm) |
|---|---|
| 0.2 | 0.07 |
| 0.3 | 0.89 |
| 0.4 | 1.77 |
| 0.5 | 1.88 |
| 0.6 | 1.67 |
| 0.7 | 1.37 |
| 0.8 | 1.09 |
| 0.9 | 0.85 |
| 1 | 0.67 |
| 1.1 | 0.53 |
| 1.2 | 0.42 |
| 1.3 | 0.33 |
| 1.4 | 0.27 |
| 1.5 | 0.22 |
| 1.6 | 0.18 |
| 1.7 | 0.15 |
| 1.8 | 0.12 |
| 1.9 | 0.10 |
| 2 | 0.09 |
| 2.1 | 0.08 |
| 2.2 | 0.06 |
| 2.3 | 0.06 |
| 2.4 | 0.05 |
| 2.5 | 0.04 |

-continued

| Wavelength (µm) | Irradiance (W/m2/nm) |
|---|---|
| 2.6 | 0.04 |
| 2.7 | 0.03 |
| 2.8 | 0.03 |
| 2.9 | 0.02 |
| 3 | 0.02 |
| 3.1 | 0.02 |
| 3.2 | 0.02 |
| 3.3 | 0.02 |
| 3.4 | 0.01 |
| 3.5 | 0.01 |
| 3.6 | 0.01 |
| 3.7 | 0.01 |
| 3.8 | 0.01 |
| 3.9 | 0.01 |
| 4 | 0.01 |

Figure 23:
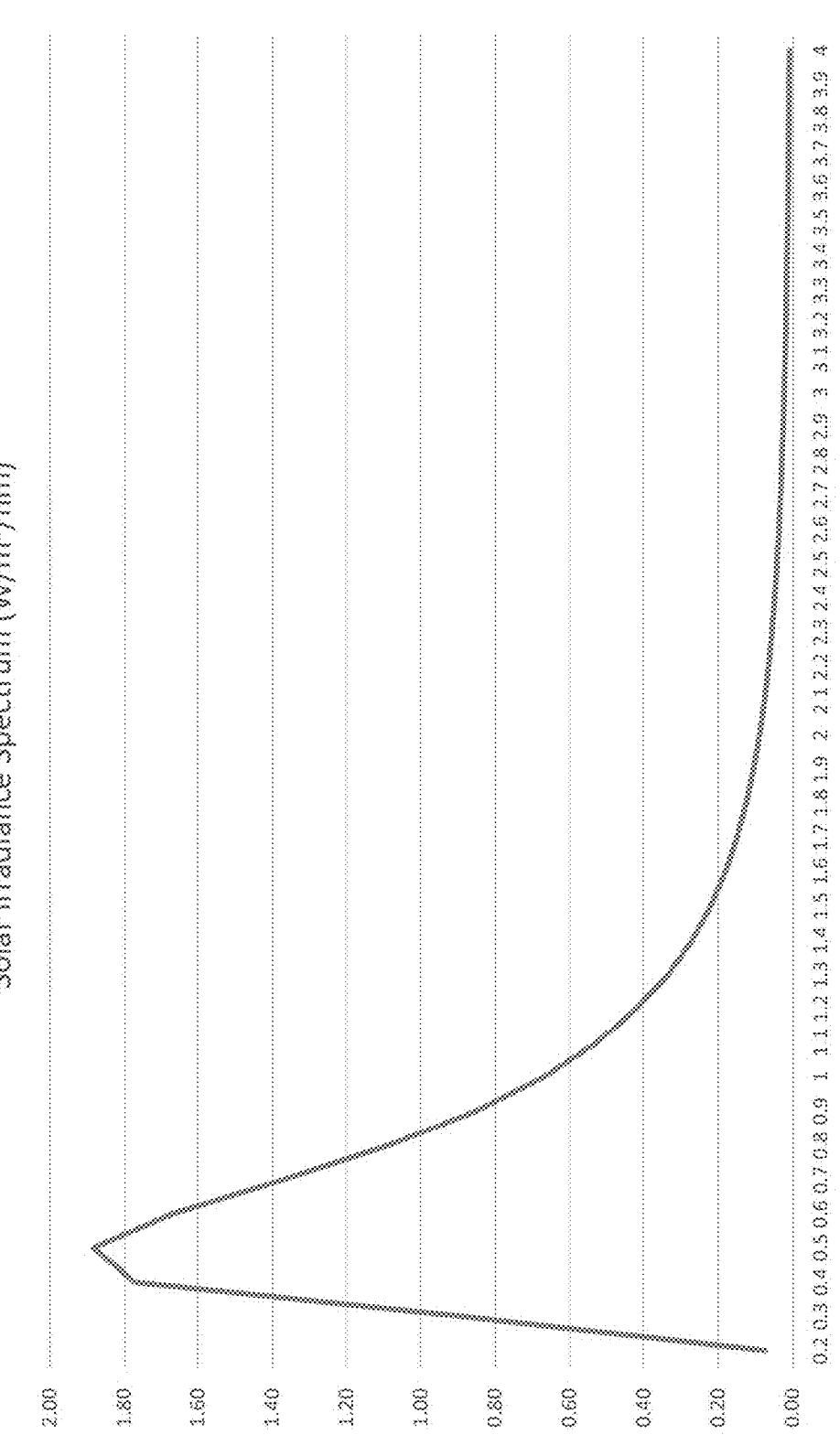
FIG. 23 illustrates the solar irradiance spectrum.

The data from Table 11 is shown graphically in FIG. 23. The data from Table 13 indicates that 99.8% of solar radiation at the earth's surface is contained within the wavelength band of 0.2 µm to 4 µm. The use of AIR articles, therefore, must account for solar radiation within the material properties or must isolate the AIR material so solar radiation wavelengths are significantly reduced prior to transmission through AIR material.

Figure 24:
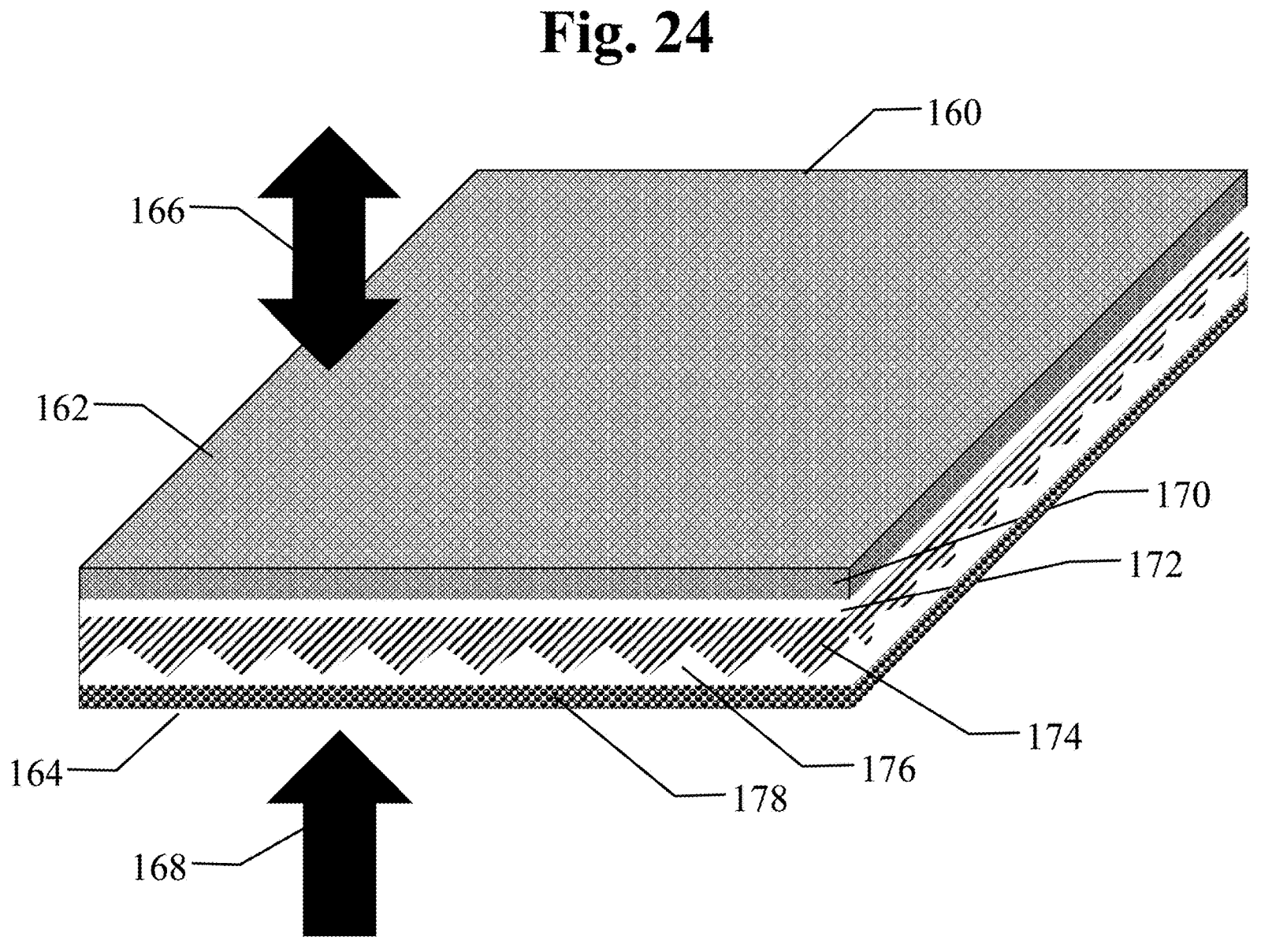

In embodiments, five-layer constructions that include AIR articles are used for radiative cooling applications in the presence of solar radiation, radiative cooling applications in the absence of solar radiation, radiative heating applications in the presence of solar radiation, and radiative heating applications in the absence of solar radiation. FIG. 24 illustrates the orientation of a construction 160 with a warm side 162 that exhibits bi-directional 166 transmittance of radiated energy and a cool side 164 that exhibits primarily unidirectional 168 transmittance of radiated energy. The properties and descriptions of the layers of five-layer constructions are listed in Table 14 below:

| Layer # Rad. | Rad. Cooling (w/solar) | Rad. Cooling (w/o solar) | Rad. Heating (w/solar) | Rad. Heating (w/o solar) |
|---|---|---|---|---|
| 1 (170) | Opaque 0.2-4 µm | High $t_m$ 4-40 µm | High $t_m$ 0.2-40 µm | High $t_m$ 4-40 µm |
| 2 (172) | low-η gas | low-η gas | low-η gas | low-η gas |
| 3 (174) | AIR 4-40 µm | AIR 4-40 µm | AIR 4-40 µm | AIR 4-40 µm |
| 4 (176) | low-η gas | low-η gas | low-η gas | low-η gas |
| 5 (178) | High $t_m$ 4-40 µm | High $t_m$ 4-40 µm | High $t_m$ 0.2-40 µm | High $t_m$ 4-40 µm |

Radiative cooling applications in the presence of solar radiation include, but are not limited to, dwellings in tropical climates and buildings that experience unwanted passive heating due to direct sunlight. In embodiments, radiative cooled dwellings and buildings are produced with outer walls and/or or rooftops that include AIR five-layer constructions in a warm-side-out orientation. In embodiments, Layer 1 consists of a material that is operably opaque to wavelengths from 0.2-4 μm, meaning that solar radiation that encounters Layer 1 is reflected or absorbed and will not experience high transmittance. Layers 2 and 4 consist of a gas that has a low (η<1.1) index of refraction. In embodiments, Layer 3 consists of an AIR (asymmetric infrared reflective) article with the flat side facing toward Layer 2 and the corner cube reflective boundary facing toward Layer 4, produced from a material that has medium (η>1.6) or high (η>2.1) index of refraction and high ($t_m$>0.8) transmittance in the wavelength ranges of 7-14 μm, 6-19 μm, 4.5-29 μm or 4-40 μm. In embodiments, Layer 5 is produced from a material that has high ($t_m$>0.8) transmittance in the wavelength range of 4-40 μm.

Radiative cooling applications in the absence of solar radiation include, but are not limited to, dwellings and buildings that are produced with inner walls and appliances and consumer or industrial devices that are produced with inner or outer walls that wish to reduce or eliminate active cooling systems for internal components or spaces. In embodiments, radiative cooled dwellings or buildings are produced with inner walls or shells and appliances or devices are produced with outer shells, walls or containers that include AIR five-layer constructions in a warm-side-out orientation. In embodiments, Layer 1 consists of any material that is operably transparent, translucent or opaque to wavelengths from 0.2-4 μm as long as solar radiation will not come in contact with the outer surface. In embodiments, Layer 1 is produced from a material that has high ($t_m$>0.8) transmittance in the wavelength range of 4-40 μm. Layers 2 and 4 consist of a gas that has a low (η<1.1) index of refraction. In embodiments, Layer 3 consists of an AIR article with a flat side facing toward Layer 2 and a corner cube reflective boundary facing toward Layer 4, produced from a material that has medium (η>1.6) or high (η>2.1) index of refraction and high ($t_m$>0.8) transmittance in the wavelength ranges of 7-14 μm, 6-19 μm, 4.5-29 μm or 4-40 μm. In embodiments, Layer 5 is produced from a material that has high ($t_m$>0.8) transmittance in the wavelength range of 4-40 μm.

Radiative heating applications in the presence of solar radiation include, but are not limited to, replacements for glass panels in greenhouse applications and for use in the production of passively-heated water heaters. In embodiments, greenhouse panels or passively-heated appliances are produced with outer shells, walls or containers that include AIR five-layer constructions in a warm-side-in orientation. In embodiments, Layer 1 consists of any material that is operably transparent to wavelengths from 0.2-4 μm, thus allowing any ambient solar radiation to pass through the barrier into the radiative heating interior. In embodiments, Layer 1 is produced from a material that has high ($t_m$>0.8) transmittance in the wavelength range of 4-40 μm. Layers 2 and 4 consist of a gas that has a low (η<1.1) index of refraction. In embodiments, Layer 3 consists of an AIR article with the flat side facing toward Layer 2 and the corner cube reflective boundary facing toward Layer 4, produced from a material that has medium (η>1.6) or high (η>2.1) index of refraction and high ($t_m$>0.8) transmittance in the wavelength ranges of 7-14 μm, 6-19 μm, 4.5-29 μm or 4-40 μm. In embodiments, Layer 5 is produced from a material that has high ($t_m$>0.8) transmittance in the wavelength range of 4-40 μm.

Radiative heating applications in the absence of solar radiation include, but are not limited to, coating material for internal pipes, tubes or conduits that transport heated gasses or fluids. In embodiments, pipes, tubes or conduits are produced with an inner construction made of non-insulated air-carrying or fluid-carrying material and an outer AIR article five-layer construction in a warm-side-in orientation. In embodiments, Layer 1 consists of any material that is operably transparent to wavelengths from 4-40 μm and has high ($t_m$>0.8) transmittance in the wavelength range of 4-40 μm. Layers 2 and 4 consist of a gas that has a low (η<1.1) index of refraction. In embodiments, Layer 3 consists of an AIR article with the flat side facing toward Layer 2 and the corner cube reflective boundary facing toward Layer 4, produced from a material that has medium (η>1.6) or high (η>2.1) index of refraction and high ($t_m$>0.8) transmittance in the wavelength ranges of 7-14 μm, 6-19 μm, 4.5-29 μm or 4-40 μm. In embodiments, Layer 5 is produced from a material that has high ($t_m$>0.8) transmittance in the wavelength range of 4-40 μm.

Persons of ordinary skill in the relevant arts will recognize that embodiments may comprise fewer features than illustrated in any individual embodiment described above. The embodiments described herein are not meant to be an exhaustive presentation of the ways in which the various features of the embodiments may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. A reflective article that exhibits asymmetric transmittance of infrared radiation at a reflective boundary, the reflective article comprising:
  a flat incident surface;
  and a material with:
    a material transmittance higher than or equal to 0.8 for all wavelengths within at least a wavelength range of 7 μm to 14 μm; and
    an index of refraction higher than or equal to 1.6 for a wavelength range of 7 μm to 14 μm; and an infrared reflective boundary that exhibits:

high transmittance for wavelengths from 7 μm to 14 μm from a non-material side of the reflective boundary; and low transmittance for wavelengths from 7 μm to 14 μm from a material side of the boundary.

2. The reflective article of claim 1, wherein the material transmittance for the material is additionally higher than or equal to 0.8 for all wavelengths within at least (i) a first additional wavelength range of 6 μm to 7 μm and (ii) a second additional wavelength range of 14 μm to 19 μm.

3. The reflective article of claim 1, wherein the index of refraction is additionally higher than or equal to 1.6 for all wavelengths within at least (i) a first additional wavelength range of 6 μm to 7 μm and (ii) a second additional wavelength range of 14 μm to 19 μm.

4. The reflective article of claim 1, wherein the material transmittance is higher than 0.85.

5. The reflective article of claim 1, wherein the non-material side of the flat incident surface operates at temperature that ranges from −20° C. to 60° C.

6. A reflective, stacked construction that exhibits asymmetric transmittance of infrared radiation, the construction comprising:

a warm side layer with an operably flat top surface, an operably flat bottom surface, created from a first material that is opaque to wavelengths from 0.2 to 4 μm, a layer consisting of a gas that has an index of refraction less than 1.1, a layer consisting of an article that exhibits asymmetric transmittance of infrared radiation at a reflective boundary, the article comprising:

a flat incident surface; and a second material with:

a material transmittance higher than or equal to 0.8 for all wavelengths within at least a wavelength range of 7 μm to 14 μm; and an index of refraction higher than or equal to 1.6 for a wavelength range of 7 μm to 14 μm; and an infrared reflective boundary that exhibits:

high transmittance for wavelengths from 7 μm to 14 μm from a non-material side of the boundary; and low transmittance for wavelengths from 7 μm to 14 μm from a material side of the boundary, a layer consisting of a gas that has an index of refraction less than 1.1, and a cool side layer with an operably flat top surface, an operably flat bottom surface, created from a third material with a transmittance higher than or equal to 0.8 for all wavelengths within at least a wavelength range to 7 to 14 μm.

7. The construction of claim 6, wherein the material transmittance for the second material is additionally higher than or equal to 0.8 for all wavelengths within at least (i) a first additional wavelength range of 6 μm to 7 μm and (ii) a second additional wavelength range of 14 μm to 19 μm.

8. The construction of claim 6, wherein the index of refraction for the second material is additionally higher than or equal to 1.6 for all wavelengths within at least (i) a first additional wavelength range of 6 μm to 7 μm and (ii) a second additional wavelength range of 14 μm to 19 μm.

9. The construction of claim 6, wherein the material transmittance is higher than 0.85.

10. The construction of claim 6, wherein a warm side of the cool side layer of the construction operates at a temperature that ranges from −20° C. to 60° C.

11. The construction of claim 6, wherein the material transmittance for the second material is additionally higher than or equal to 0.8 for all wavelengths within a wavelength range of 4.5 μm to 7 μm and (ii) a second additional wavelength range of 14 μm to 29 μm.

12. The construction of claim 6, wherein the material transmittance for the second material is additionally higher than or equal to 0.8 for all wavelengths within at least (i) a first additional wavelength range of 4 μm to 7 μm and (ii) a second additional wavelength range of 29 μm to 40 μm.

13. The construction of claim 6, wherein both of the material transmittance for the second material is additionally higher than or equal to 0.8 and the index of refraction for the second material is higher than or equal to 1.6 for all wavelengths within at least (i) a first additional wavelength range of 4.5 μm to 7 μm and (ii) a second additional wavelength range of 14 μm to 29 μm.

14. The construction of claim 6, wherein both of the material transmittance for the second material is additionally higher than or equal to 0.8 and the index of refraction for the second material is higher than or equal to 1.6 for all wavelengths within at least (i) a first additional wavelength range of 4 μm to 7 μm and (ii) a second additional wavelength range of 14 μm to 40 μm.

15. The construction of claim 6, wherein the index of refraction for the second material is additionally higher than or equal to 1.6 for all wavelengths within at least (i) a first additional wavelength range of 4 μm to 7 μm and (ii) a second additional wavelength range of 14 μm to 40 μm.

16. The construction of claim 6, wherein both of the index of refraction is additionally higher than or equal to 1.6 for the second material and the material transmittance is higher than or equal to 0.8 for the second material for all wavelengths in (i) a first additional wavelength range of 6 μm to 7 μm and (ii) a second additional wavelength range of 14 μm to 19 μm.

17. The construction of claim 6, wherein the index of refraction wavelength range for the third material is additionally higher than or equal to 1.6 for all wavelengths in (i) a first additional wavelength range of 4 μm to 7 μm and (ii) a second additional wavelength range of 14 μm to 40 μm.

18. The construction of claim 6, wherein the index of refraction wavelength range for the second material is additionally higher than or equal to 1.6 for all wavelengths in (i) a first additional wavelength range of 4.5 μm to 7 μm and (ii) a second additional wavelength range of 14 μm to 29 μm.

19. The construction of claim 5, wherein the reflective boundary is a retroreflective element of a corner cube element.

20. The article of claim 1, wherein the material transmittance of the material is additionally higher than or equal to 1.6 for all wavelengths in (i) a first additional wavelength range of 4.5 μm to 7 μm and (ii) a second additional wavelength range of 14 μm to 29 μm.

21. The article of claim 1, wherein the material transmittance of the material is additionally higher than or equal to 0.8 for all wavelengths within at least (i) a first additional wavelength range of 4 μm to 7 μm and (ii) a second additional wavelength range of 14 μm to 40 μm.

22. The article of claim 1, wherein one or both of the material transmittance for the material is additionally higher than or equal to 0.8 and the index of refraction for the material is higher than or equal to 1.6 for all wavelengths within at least (i) a first additional wavelength range of 4.5 μm to 7 μm and (ii) a second additional wavelength range of 14 μm to 29 μm.

23. The article of claim 1, wherein one or both of the index of refraction for the material is additionally higher than or equal to 1.6 and the material transmittance for the material is higher than or equal to 0.8 for all wavelengths in a (i) a first additional wavelength range of 4 μm to 7 μm and (ii) a second additional wavelength range of 14 μm to 40 μm.

24. The article of claim 1, wherein one or both of the index of refraction for the material is additionally higher than or equal to 1.6 and the material transmittance for the material is higher than or equal to 0.8 for all wavelengths in a (i) a first additional wavelength range of 4.5 μm to 7 μm and (ii) a second additional wavelength range of 14 μm to 29 μm.

25. The article of claim 1, wherein the index of refraction for the material is additionally higher than or equal to 1.6 for all wavelengths in (i) a first additional wavelength range of 4 μm to 7 μm and (ii) a second additional wavelength range of 14 μm to 40 μm.

26. The article of claim 1, wherein the index of refraction for the material is additionally higher than or equal to 1.6 for all wavelengths in (i) a first additional wavelength range of 4.5 μm to 7 μm and (ii) a second additional wavelength range of 14 μm to 29 μm.

27. The article of claim 1, wherein the reflective boundary is a retroreflective element of a corner cube element.

* * * * *